United States Patent
Nespor

(10) Patent No.: US 8,152,435 B2
(45) Date of Patent: *Apr. 10, 2012

(54) FLATBED TOW TRUCK PIVOTING PLATFORM ASSEMBLY AND METHOD OF USE

(76) Inventor: Ronald R. Nespor, Osprey, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 13/021,704

(22) Filed: Feb. 4, 2011

(65) Prior Publication Data

US 2011/0194925 A1  Aug. 11, 2011

Related U.S. Application Data

(63) Continuation-in-part of application No. 12/701,555, filed on Feb. 6, 2010, now Pat. No. 7,909,560.

(51) Int. Cl.
*B60P 3/12* (2006.01)
(52) U.S. Cl. .................. 414/812; 414/538
(58) Field of Classification Search .............. 414/537, 414/538, 563, 812
See application file for complete search history.

(56) References Cited

U.S. PATENT DOCUMENTS

| | | |
|---|---|---|
| 2,621,814 A | 12/1952 | Lisota |
| 3,430,792 A | 3/1969 | Grove et al. |
| 3,450,282 A | 6/1969 | Ezolt |
| 3,485,400 A | 12/1969 | Pewthers |
| 4,081,094 A | 3/1978 | Pereira et al. |
| 4,318,657 A | 3/1982 | Znidaric |
| 4,578,014 A | 3/1986 | Colet |
| 4,702,662 A | 10/1987 | Marlett |
| 4,704,062 A | 11/1987 | Hale |
| 4,795,303 A | 1/1989 | Bubik |
| 4,842,470 A | 6/1989 | Hubbard |
| 4,875,822 A | 10/1989 | Nespor |
| 4,929,142 A | 5/1990 | Nespor |
| 5,006,033 A | 4/1991 | McConnell |
| 5,061,147 A | 10/1991 | Nespor |
| 5,246,329 A | 9/1993 | Farrell |
| 5,249,909 A | 10/1993 | Roberts et al. |
| 5,529,454 A | 6/1996 | Alm et al. |
| 5,720,526 A | 2/1998 | Roberts |
| 5,779,431 A | 7/1998 | Alm et al. |
| 5,984,614 A | 11/1999 | Weber |
| 6,276,890 B1 | 8/2001 | Pratt |
| 6,336,783 B1 | 1/2002 | Young et al. |
| 6,354,785 B2 | 3/2002 | Maeno |
| 6,461,096 B1 | 10/2002 | Mentele et al. |
| 7,401,860 B2 | 7/2008 | Kraenzle |

*Primary Examiner* — Charles A Fox
(74) *Attorney, Agent, or Firm* — Gold & Rizvi, P.A.; Glenn E. Gold; H. John Rizvi

(57) ABSTRACT

A flatbed vehicle carrier assembly comprising a carrier body subassembly including a carrier floor supported by a carrier body slide enabling sill frame. An intermediate subframe subassembly is capable of sliding and being pivotally integrated with a slide enabling tilt and pivotal control subassembly, which is pivotally secured therebetween to a mounting platform support assembly. A pivot control device provides a means to rotate and rearwardly transfer and posture the intermediate subframe. The carrier body sill frame is slideably assembled to the intermediate subframe, being driven by a longitudinal control actuator. A ramp can be pivotally integrated into a loading end of the carrier body subassembly. The carrier and ramp floors are fabricated of a series of interlocking extrusion members.

20 Claims, 21 Drawing Sheets

FLATBED TOW TRUCK PIVOTING PLATFORM ASSEMBLY AND METHOD OF USE

CROSS-REFERENCE TO RELATED APPLICATIONS

This is a Continuation In Part Application that claims the benefit of U.S. application Ser. No. 12/701,555, filed Feb. 6, 2010 with the United States Patent & Trademark Office, which subsequently issued as U.S. Pat. No. 7,909,560 on Mar. 22, 2011, which is hereby incorporated by reference herein in its entirety.

FIELD OF THE INVENTION

The present disclosure generally relates to an apparatus and method for a transporting vehicles and other similar sized objects. More particularly, the present disclosure relates to a vehicle carrier utilizing a pair of sliding interfaces interacting with a pivot arm to drive a carrier body between a loading configuration and a transport configuration.

BACKGROUND OF THE INVENTION

The purpose of the invention is to provide an apparatus for transporting large objects such as vehicles. Vehicle transport systems, commonly referred to as tow trucks, have been evolving in parallel with the automobile. There are several classifications of towing equipment, including a boom, a hook and chain, a wheel-lift, a flatbed, and an integrated system.

A boom is generally utilized for recovering vehicles that are in a ditch, culvert, over an embankment, or any place the vehicle cannot be safely backed-up to. A boom may or may not be used for towing a recovered vehicle.

A hook and chain, also known as a "sling" or "belt lift", loops chains around the vehicle frame or axle, which is drawn aloft by a boom winch to rest against a pair of heavy rubberized mats so the customer's vehicle can be towed on its other axle. In today's environment, the use of slings is very limited, as they are known to scratch bumpers of cars. They are generally used for towing vehicles that have been in an accident or have one or two of the front or rear wheels missing or for pickup trucks and other vehicles that have steel bumpers A wheel-lift evolved from the hook and chain technology, utilizing a large metal yoke that is fitted under the front or rear wheels to cradle them. The wheel-lift raises the front or rear end of the vehicle off the ground by a pneumatic or hydraulic hoist so it can be towed. This apparatus generally picks up the drive wheels of the vehicle (i.e. the front wheels if it is front wheel drive, the rear wheels if it is rear wheel drive). The lift only touches the tires, limiting any risk of damage to the towed vehicle.

A flatbed, also referred to as a rollback or a slide back carrier provides a carrier body placed over the entire trailer portion of a truck. The bed can be hydraulically inclined and moved to ground level, allowing the customer's vehicle to be placed onto the carrier body under its own power or pulled by a winch.

An integrated lift, also referred to as a "Self Loader" Snatcher, Quick Pick or Repossession Truck, integrates a boom and wheel-lift into a single unit. The integrated lift is generally installed onto light duty trucks to repossess vehicles or move illegally parked vehicles. Most have controls for the apparatus inside the cab of the tow truck to make quick pickup possible without the loss of time to exit the truck to manually hook up the vehicle.

These are the most common arrangements, but are by no means exclusive; as there are flatbed units that offer a wheel-lift, boom trucks that can recover but not tow, and wheel-lift units that offer a combination boom with sling.

Flatbed carriers utilize a slide and tilt mechanism that is integrated into the trailer portion of a chassis frame of a truck. The flatbed is coined from a flat carrier body used to load and transport a vehicle. The system is operated via a series of hydraulic pistons. One hydraulic piston adjusts the position of the carrier body along a longitudinal axis of the vehicle. A second hydraulic piston rotates the carrier body between a loading angle and a transporting angle. The carrier body is a single, planar surface. The carrier body needs to be positioned into a transport configuration, wherein the carrier body is drawn forward, locking the body into position via a pair of locking pins or receptacle located on the trailer portion of the frame, proximate the cab. A wheel lift may also be integrated onto some flatbed carriers. The wheel lift is affixed to the flatbed carrier frame as an appendage thereof.

Flatbed or slideback carriers have been utilized for transporting vehicles since the late 1960's. Wheel lifts were developed for transporting vehicles in the 1980's. The wheel-lift was integrated into the slideback carrier and is dependent upon the carriers articulating support structure as its operative and structural support mechanism.

One shortcoming of the currently available configuration is the designs limitations. Each of the carrier body assemblies for creation of a flatbed vehicle transportation truck is limited in that the design is specific to the configuration of the receiving vehicles construction. The variety of donor vehicles and imposed conflicts between each of the wide range of different truck chassis frame configurations and safety standards in the market place limit the interchangeability between product designs. This directs the carrier body manufacturer to make available a series of designs for specific or potential donor vehicles. Additionally, the balance of the distribution chain is challenged to inventory and support many varieties of form factors to support the possible donor vehicles. A single design that is adaptable to any donor vehicle is desirable.

A second shortcoming of the currently available configuration is the need to reinforce or modify the structure of the donor truck's chassis frame prior to mounting a non-affixed articulating type of truck body similar to the flatbed carrier assembly. Structural modifications to the donor vehicle's chassis frame can impact the vehicle's warranty, any prior government design approvals, certifications, and the like. Significant considerations need to be made prior to making any structural changes to the donor vehicle. A carrier body assembly that avoids any modifications to the donor vehicle's chassis frame is desirable. A design that can be integrated onto light and medium duty trucks is desired.

A third shortcoming of the currently available carrier configuration is the requirement of a long carrier body length who's structural mass is abnormally overextended by design beyond the vehicle's rear axle and suspension members during over the road transport mode, in order to achieve a respectable loading angle when the distal end of the carrier body is in contact with the ground or load receiving surface, and is longer than required to support the overall wheel base of a vehicle such as an extended pick up truck or an oversized luxury car, such as a Rolls Royce, during transport. Normally, the carrier body is required to be positioned fully retracted, thus engaging locking pins prior to transporting any vehicles. This configuration is considered overkill for the majority of smaller or medium cars and vans. These longer towing vehicles with an extended rear overhang are disproportionally balanced, are less stable, and are heavier, thus resulting in higher fuel costs. These longer towing vehicles are also less maneuverable than shorter vehicles, particularly in tight areas such as cities. A carrier body assembly that can be integrated onto a donor vehicle with a shorter overall dimension is desirable.

SUMMARY OF THE INVENTION

The basic inventive concept for a flatbed vehicle carrier.

A first aspect of the present invention provides a flatbed carrier assembly comprising:

a chassis mounting platform assembly;

a carrier body subassembly comprising a carrier floor supported by a carrier body;

a slide enabling sill frame being integrated into the carrier body;

a carrier body intermediate subframe with a plurality of longitudinally arranged slide provisions provided in a parallel arrangement;

a carrier tilt and longitudinal control inner pivotal subassembly being slideably assembled to the carrier body intermediate subframe and pivotally assembled to the chassis mounting platform;

a carrier pivot control device extending between the carrier body intermediate subframe and the chassis mounting platform assembly;

a carrier body longitudinal actuator member to slideably position the carrier body subassembly along a longitudinal axis of the carrier body subassembly, the carrier body longitudinal actuator member having a first end attached to the carrier intermediate subframe and a second end attached to the carrier body subassembly; and a carrier tilt and longitudinal control inner subframe motion actuator having a first end attached to the carrier tilt and longitudinal control inner pivotal subassembly and a second end attached to the carrier intermediate subframe subassembly, wherein the carrier tilt and longitudinal control inner subframe motion actuator slideably positions the carrier intermediate subframe subassembly parallel to the longitudinal axis of the carrier body subassembly, wherein the sliding motion works on conjunction with the carrier pivot control device to generate a pivotal motion of the carrier intermediate subframe subassembly.

A second aspect of the present invention integrates a series of extrusions to form the carrier body.

In another aspect of the present invention, the carrier body further comprises a pivotal ramp assembly located adjacent to a loading end of the carrier body.

In another aspect, the pivotal ramp assembly is fabricated via a series of integrated extrusions. The extrusions utilized are preferably the same as those provided for the carrier body.

In another aspect, the pivotal ramp assembly is operated via a rotating cam assembly.

In another aspect, the pivotal ramp assembly is operated via a motive driven cable chain drive assembly.

In another aspect, the pivotal ramp assembly is operated via a hydraulic assembly.

In another aspect, the carrier drive mechanism is a hydraulic assembly.

In another aspect, the carrier pivotal control motion actuator is a hydraulic assembly.

In another aspect, a wheel lift subassembly is attached to and able to slide within the chassis mounting platform assembly.

In another aspect, the wheel lift comprises a lateral extension mechanism and a pivot control mechanism.

In another aspect, the flatbed carrier assembly is complete and independent of a vehicle trailer frame, wherein the flatbed carrier assembly can be adapted to any reasonable vehicle trailer frame.

Details of these and additional aspects of the present invention are presented in the detailed description of the drawings presented below.

BRIEF DESCRIPTION OF THE DRAWINGS

The invention will now be described, by way of example, with reference to the accompanying drawings, where like numerals denote like elements and in which.

Like reference numerals refer to like parts throughout the various views of the drawings.

DETAILED DESCRIPTION OF THE INVENTION

Figure 1:
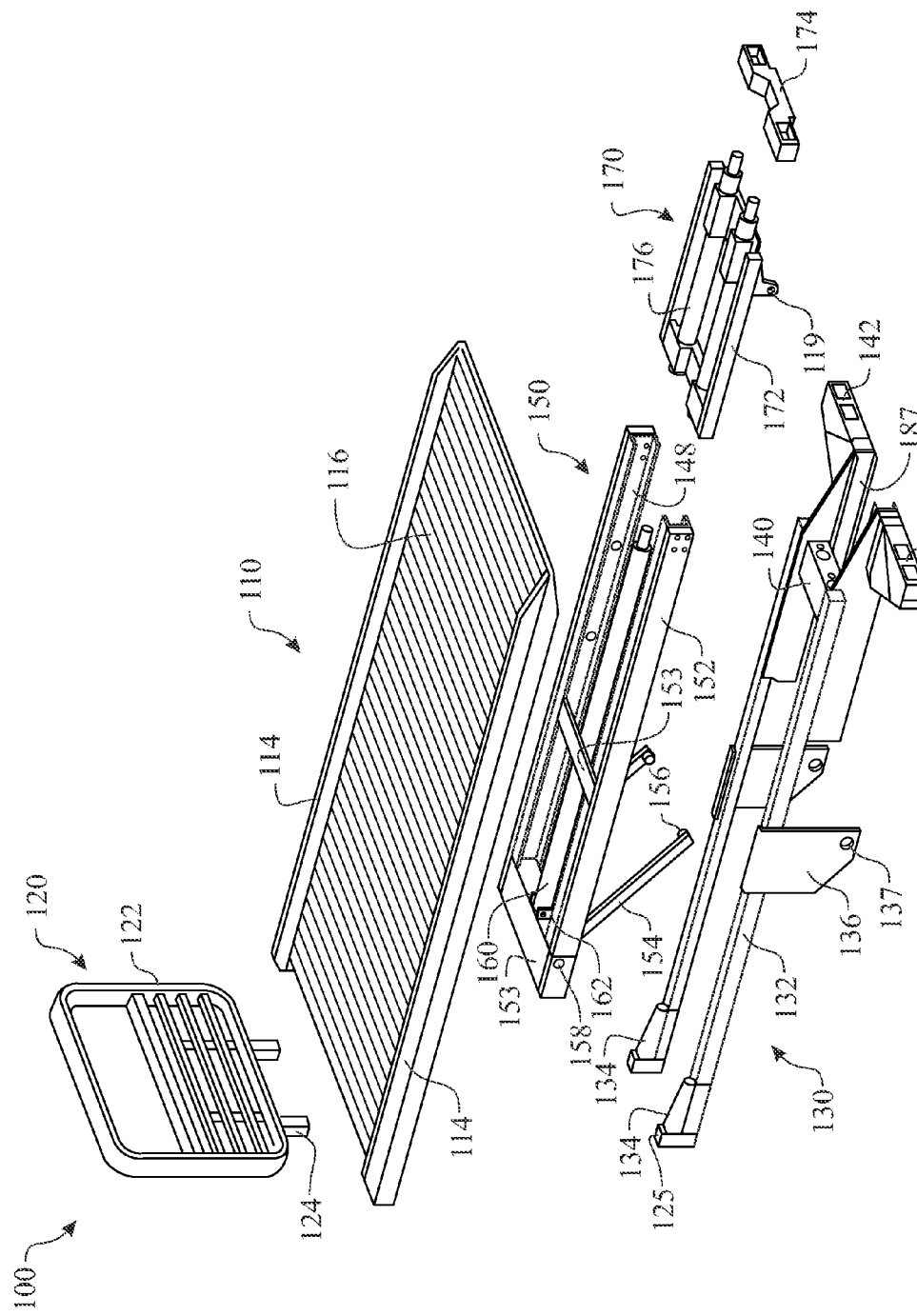
FIG. 1 presents a top isometric exploded assembly view of the basic elements of a flatbed carrier and mounting platform assembly.
Figure 2:
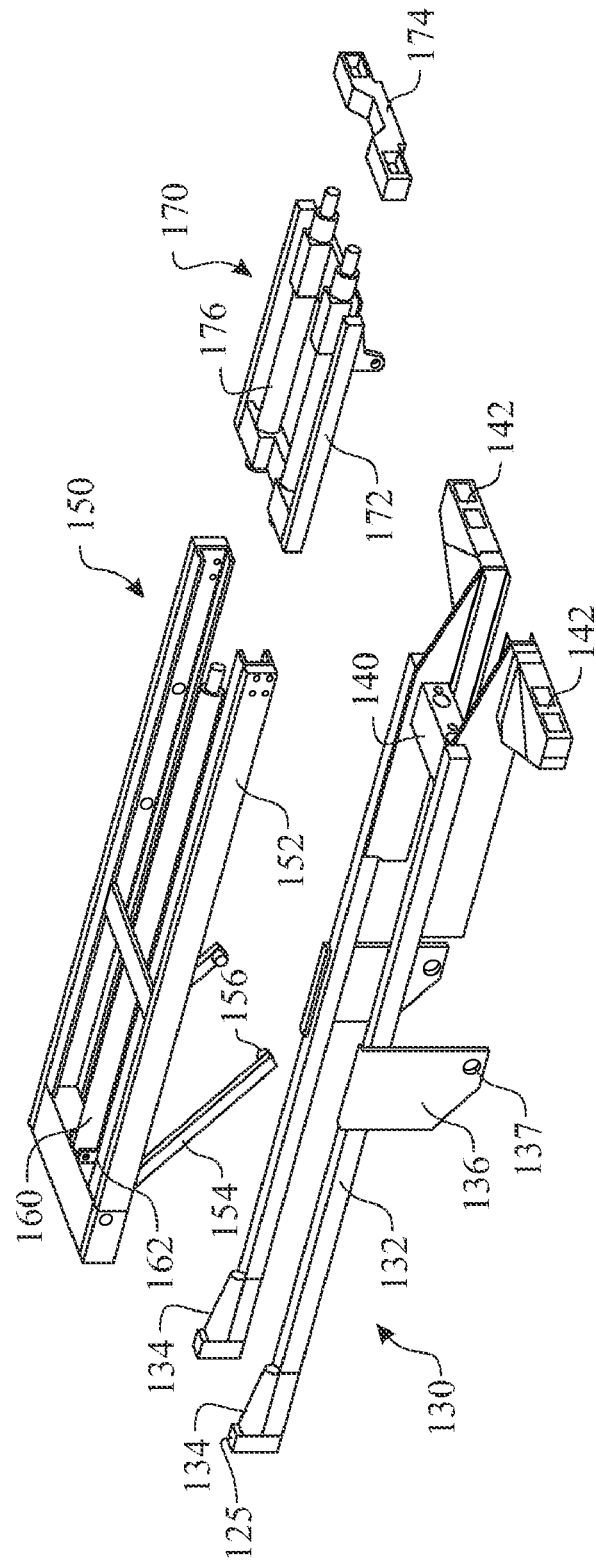
FIG. 2 presents a top isometric exploded assembly view of the operative elements of the flatbed carrier and mounting platform assembly of FIG. 1.
Figure 3:
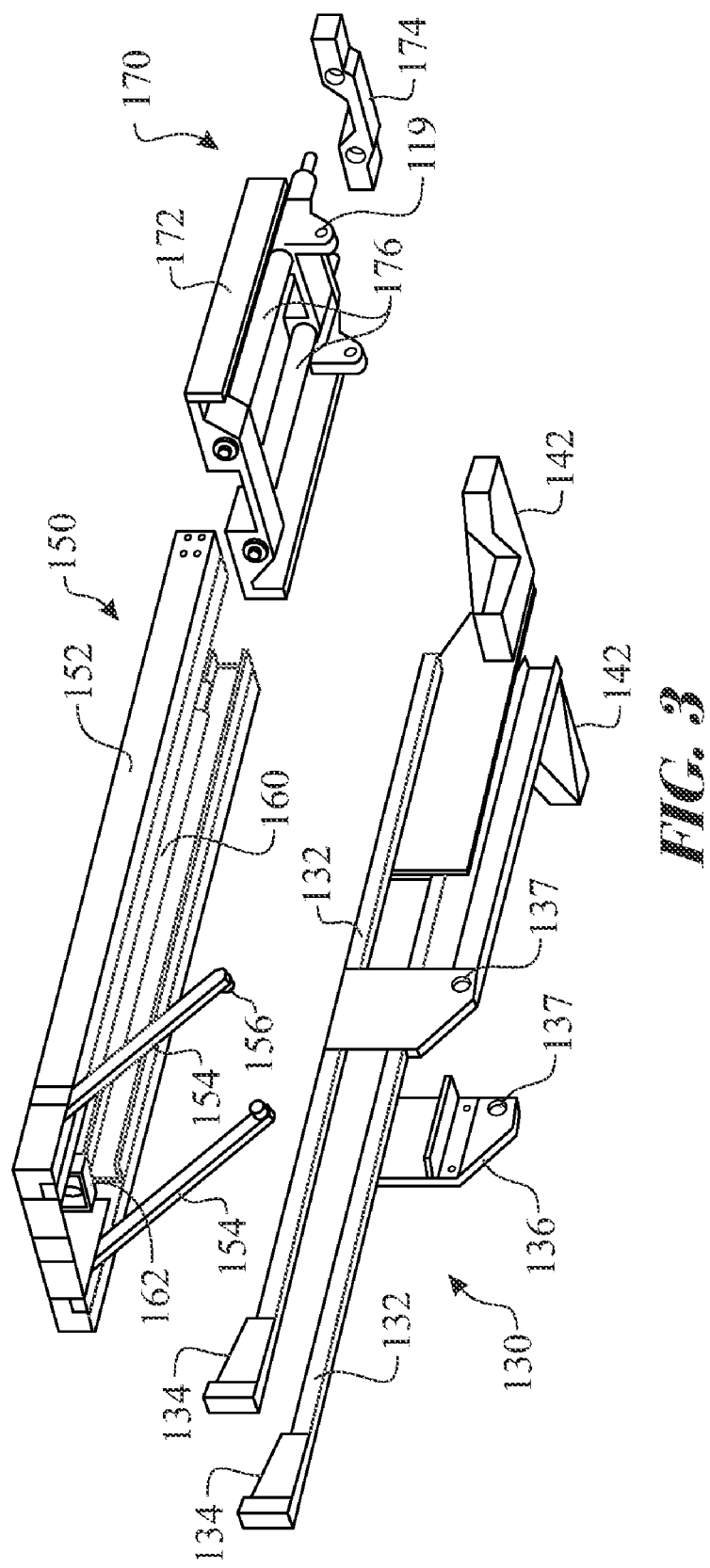
FIG. 3 a bottom isometric exploded assembly view of the operative elements of the flatbed carrier and mounting platform assembly of FIG. 1.
Figure 4:
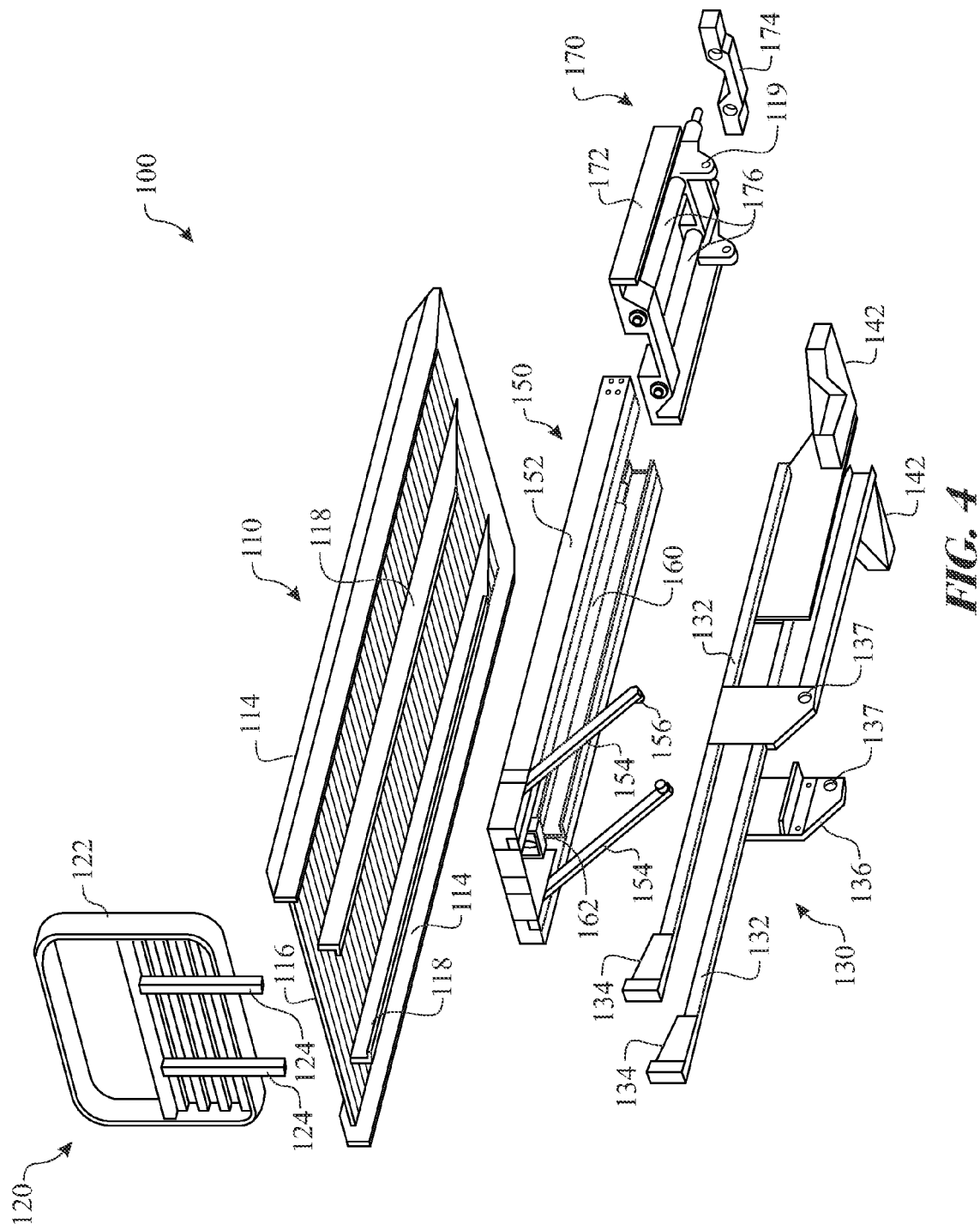
FIG. 4 presents a bottom isometric exploded assembly view of the basic elements of the flatbed carrier and mounting platform assembly of FIG. 1.
Figure 5:
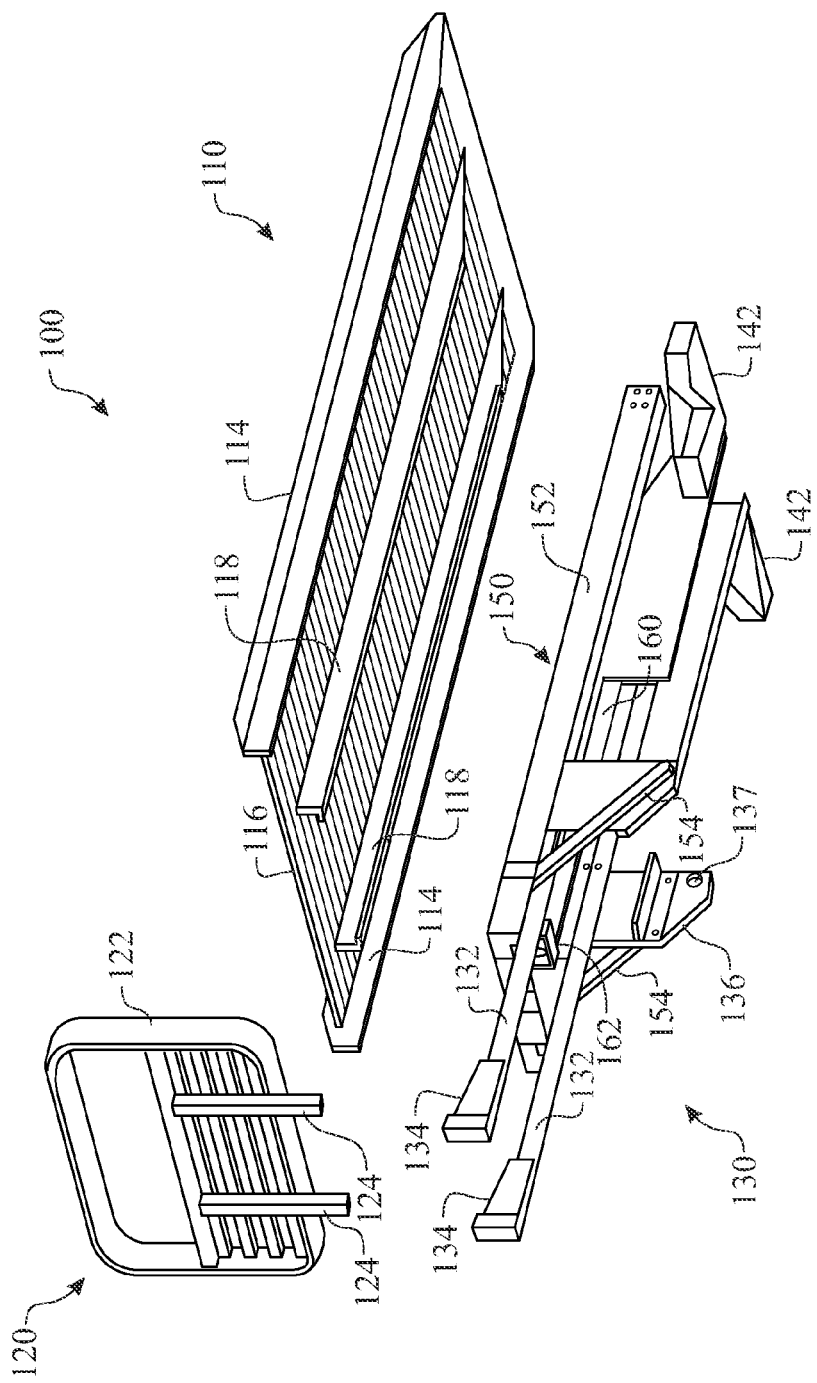
FIG. 5 presents a bottom isometric partially assembled view of the flatbed carrier, the intermediate subassembly, and the mounting platform assembly of FIG. 1.
Figure 6:
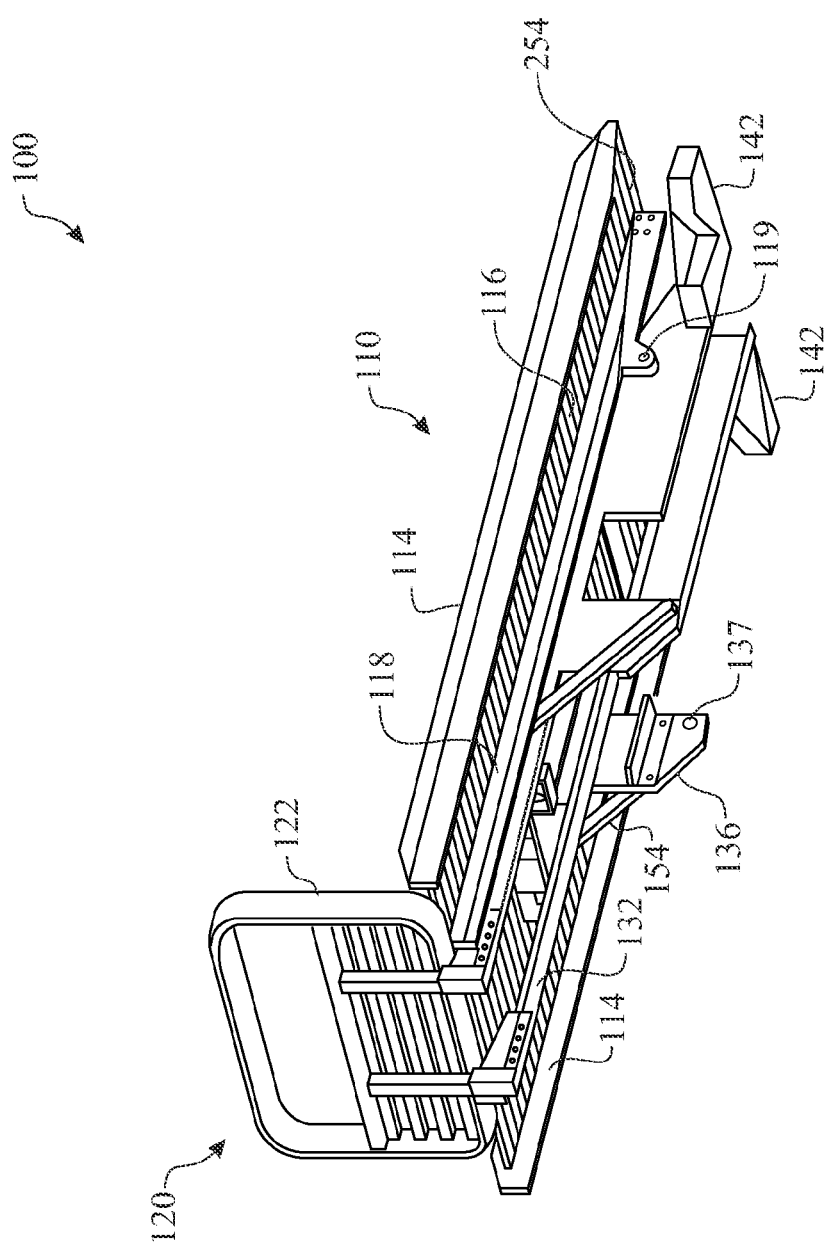
FIG. 6 presents a bottom isometric fully assembled view of the flatbed carrier assembly and the intermediate subassembly integrated upon the mounting platform assembly of FIG. 1.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 16:
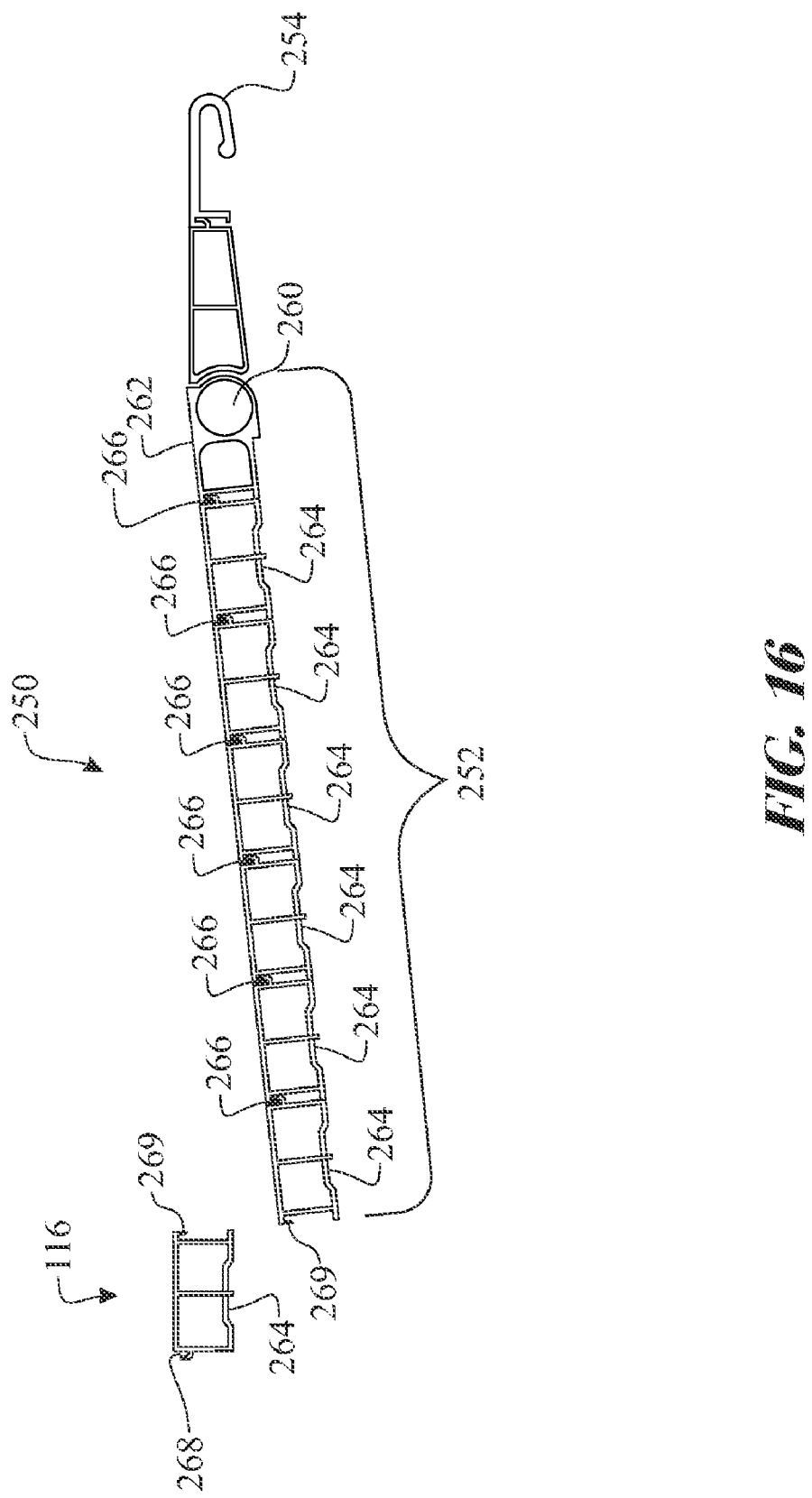
FIG. 16 presents a sectional side view of the pivotal ramp assembly detailing a series of integrated extrusions.
Figure 17:
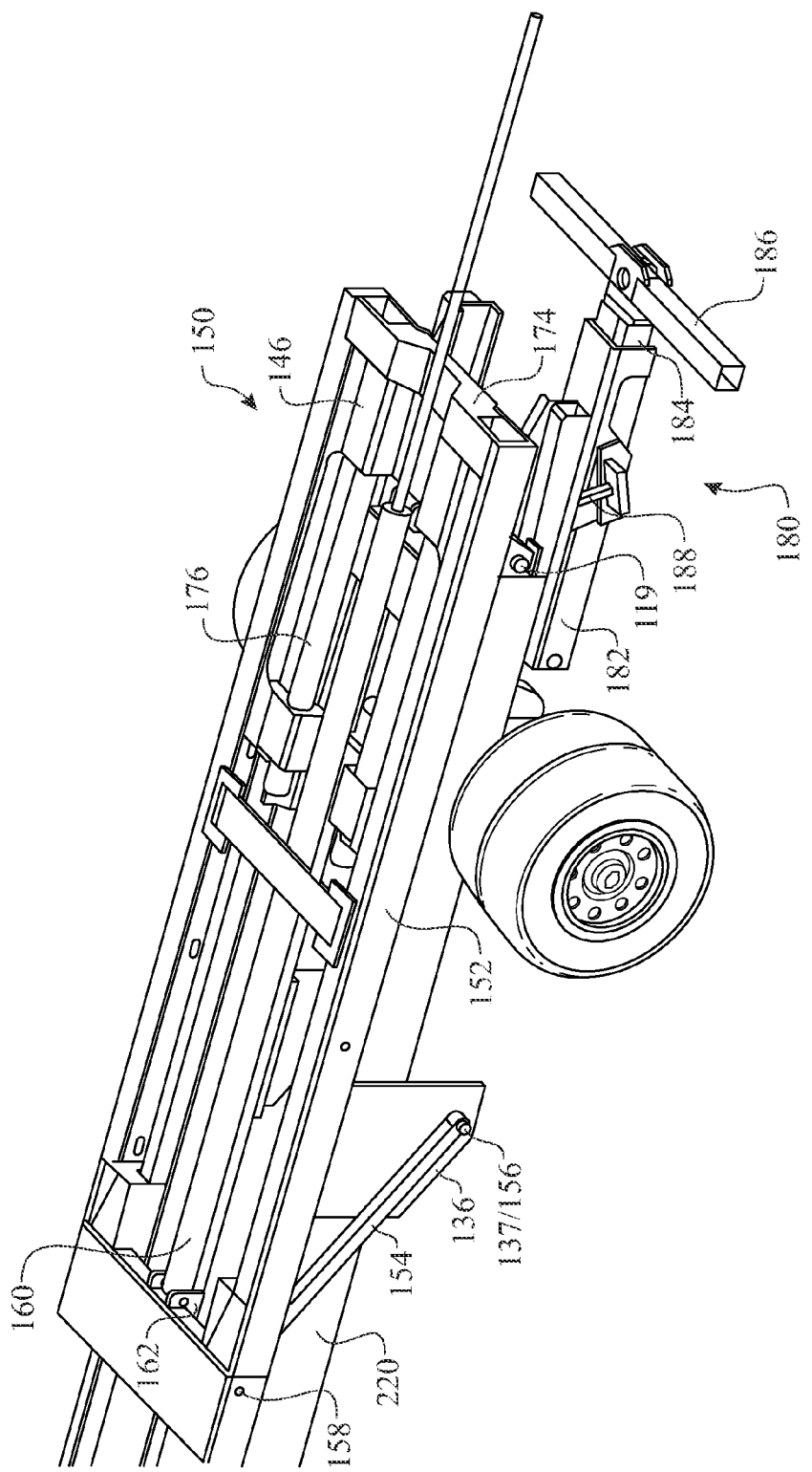
FIG. 17 presents an isometric view of the operable mechanisms of the flatbed carrier assemblies and wheel lift subassembly integrated onto the carrier vehicle chassis.
Figure 18:
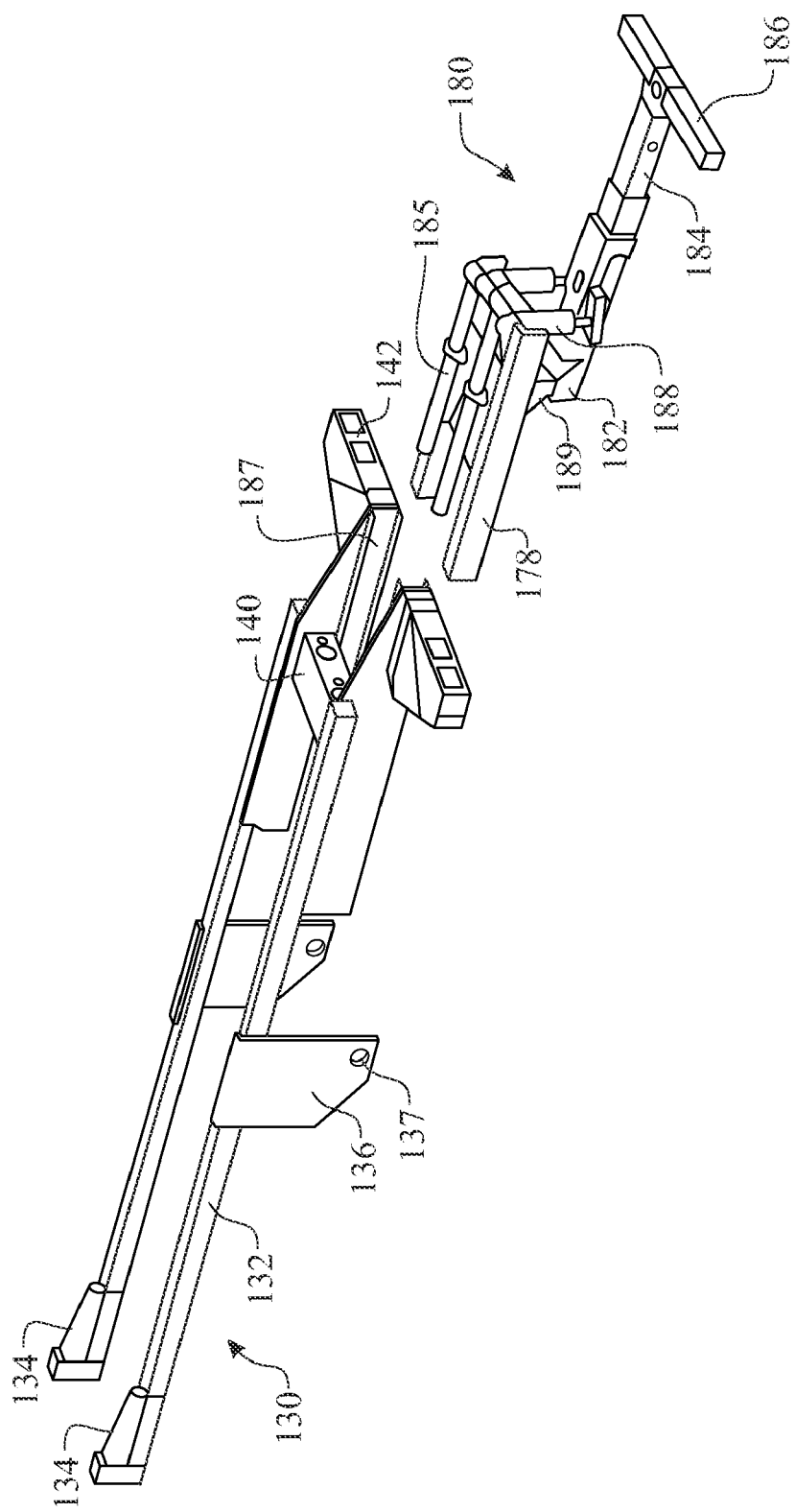
FIG. 18 presents a top isometric exploded assembly view of the chassis mounting platform assembly and wheel lift subassembly.
Figure 19:
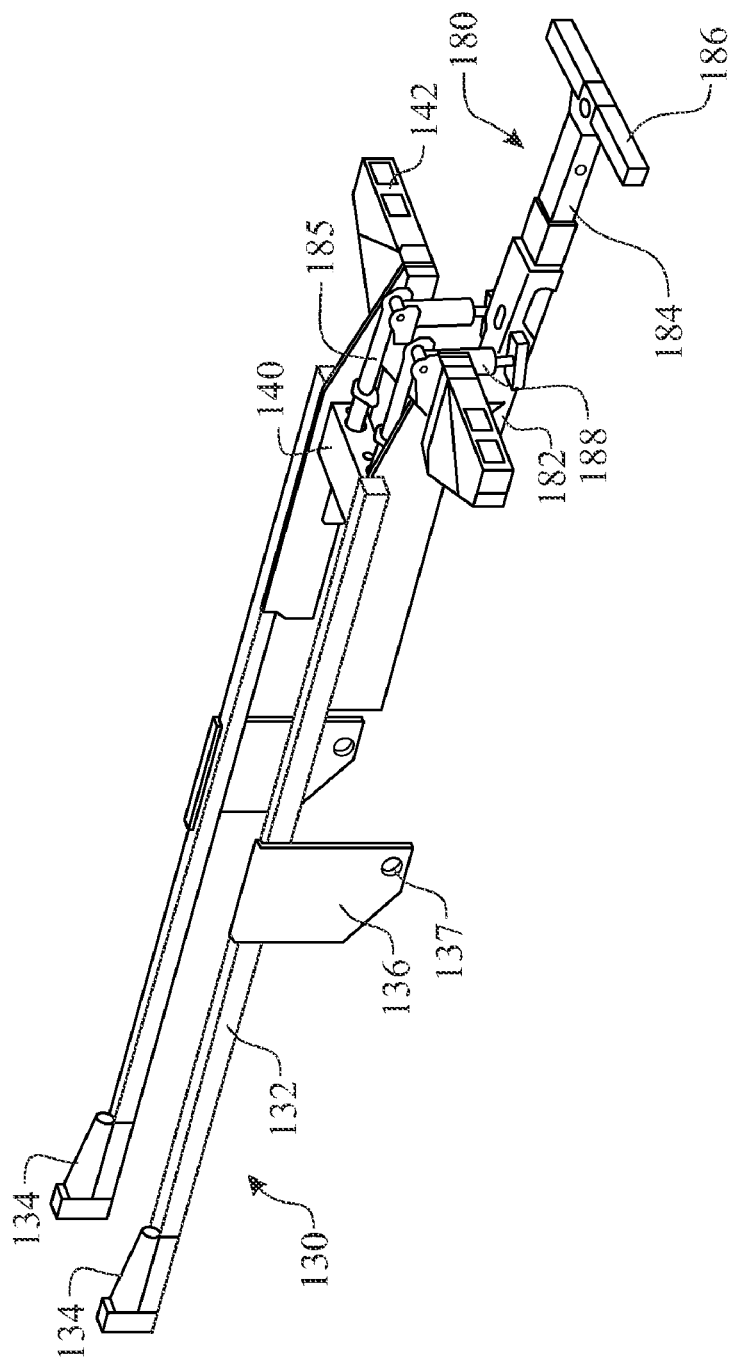
FIG. 19 presents a top isometric view of the wheel lift subassembly assembled into the chassis mounting platform.
Figure 20:
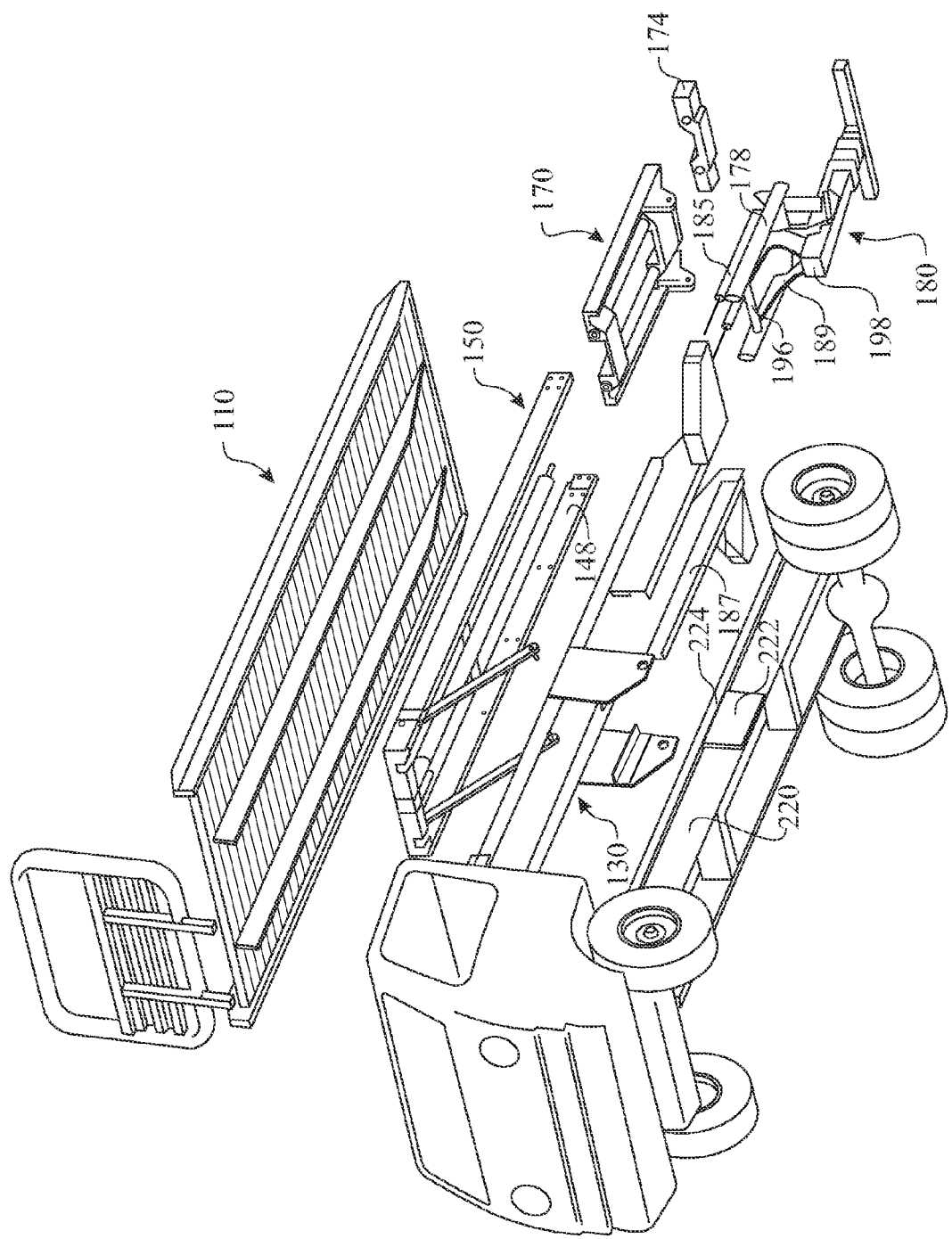
FIG. 20 presents a bottom isometric exploded assembly view of the flatbed carrier assemblies, the wheel lift assembly, the mounting platform assembly, and the carrier vehicle.
Figure 21:
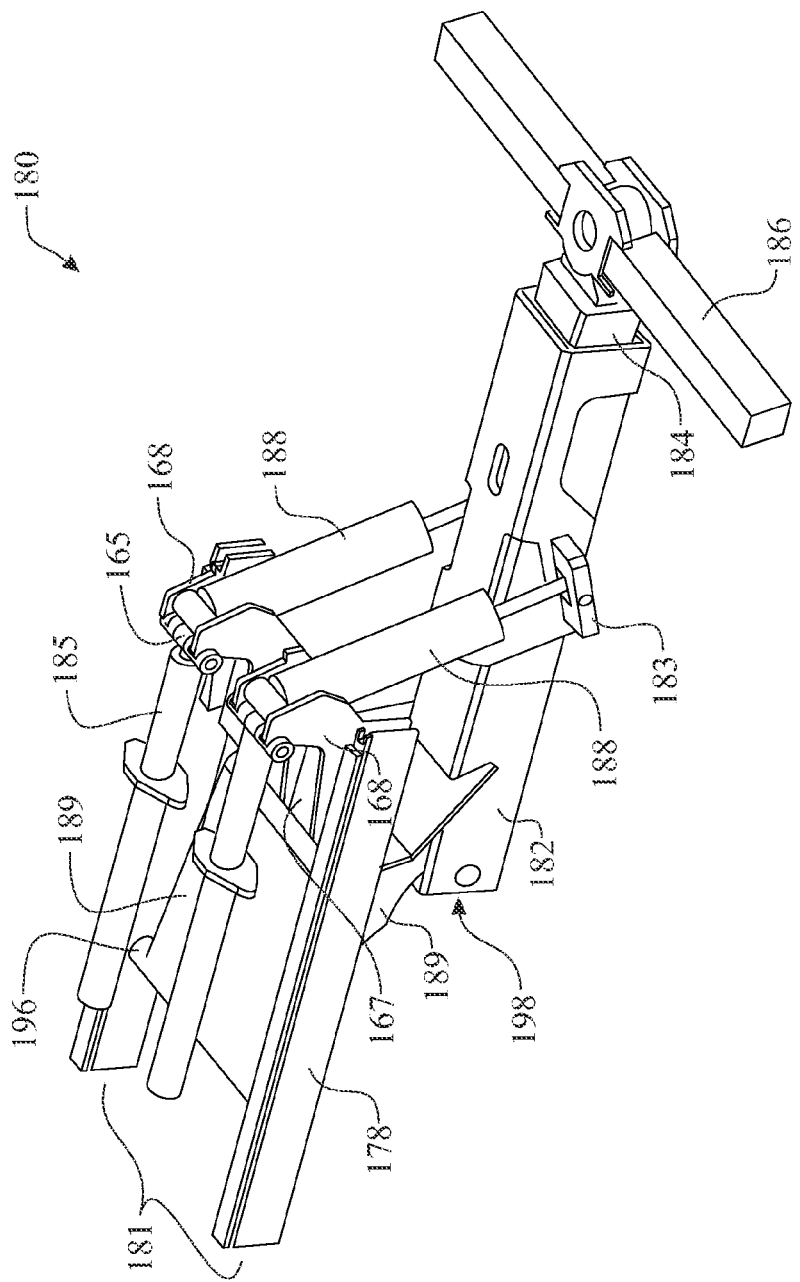
FIG. 21 presents a top isometric view of the independent wheel lift assembly.

A carrier assembly 100 is presented in FIGS. 1 through 6. The carrier assembly 100 comprises several subassemblies, including a carrier body subassembly 110, a chassis mounting platform assembly 130, a carrier intermediate subframe subassembly 150 and a carrier tilt and longitudinal control inner pivotal subassembly 170. The carrier body subassembly 110 is fabricated having a carrier body floor assembly 116 spanning between a pair of longitudinally arranged carrier body edge rails 114. The carrier body floor assembly 116 is fabricated of a plurality of extrusions, which will be detailed in FIG. 16. The carrier body floor assembly 116 is supported via a carrier body slide enabling sill frame. The carrier body slide enabling sill frame comprises a pair of carrier body sill frame channels 118 disposed upon an underside of the carrier body floor assembly 116. The carrier body sill frame channels 118 are preferably fabricated of a pair of "C" or "L" shaped channels attached to the carrier body subassembly 110 along a longitudinal axis of the carrier body subassembly 110. The carrier body sill frame channels 118 are spaced to ride along the outer edges of the carrier intermediate subframe subassembly 150.

Figure 7:
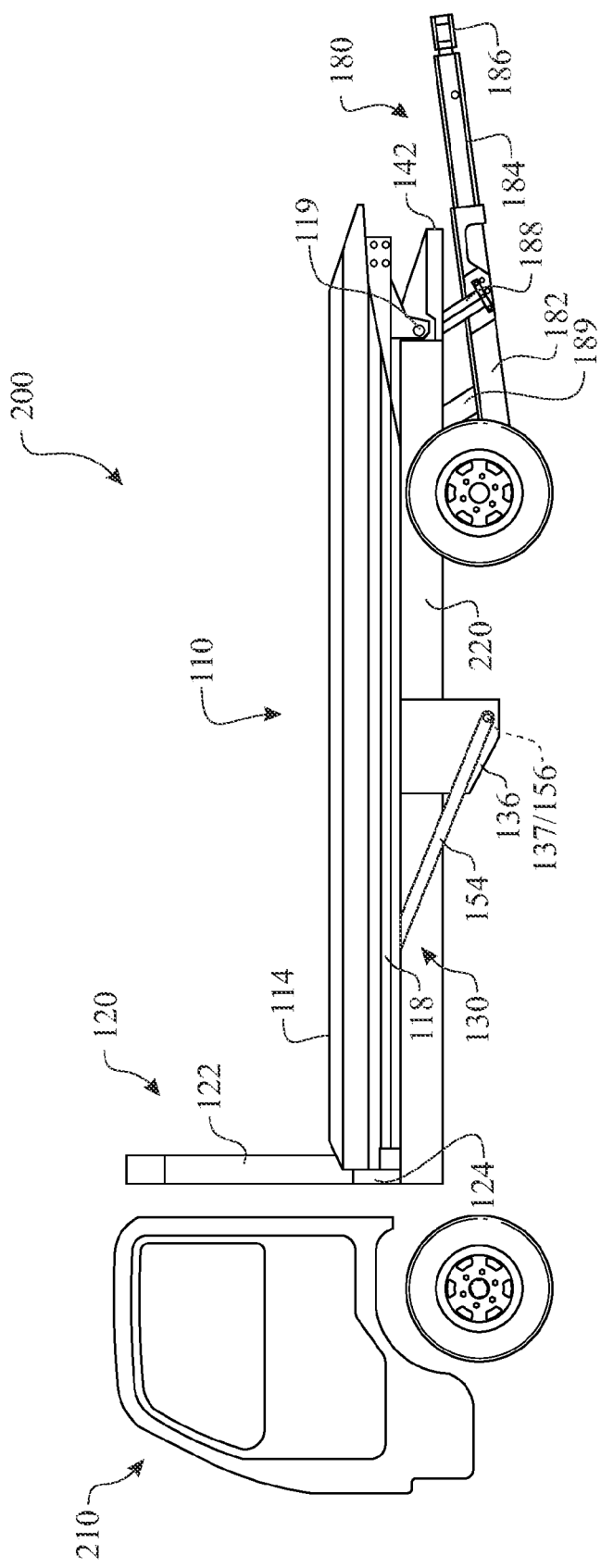
FIG. 7 presents an elevation view of a carrying vehicle having a flatbed carrier assembly integrated thereon and introducing a wheel lift subassembly.

The chassis mounting platform assembly 130 is fabricated having a pair of mounting platform rail and chassis reinforcement members 132 designed to be directly or indirectly attached to a vehicle frame (220 of FIG. 7). A headboard socket 125 and reinforced mounting platform attachment device 134 is integrated at a cab end of each mounting platform rail and chassis reinforcement member 132. The headboard socket 125 and reinforced mounting platform attachment device 134 reinforces the attachment and rigidity of the mounting platform rail and chassis reinforcement member 132. An independent wheel lift subassembly support cross member 140 is provided at a lift end of the chassis mounting platform assembly 130. A similar cross member (not shown) can be assembled to the chassis mounting platform assembly 130, spanning between the cab ends of the pair of mounting platform rail and chassis reinforcement members 132. The cross members also provide stiffness to the chassis mounting platform assembly 130, as well as an additional regions for mounting the chassis mounting platform assembly 130 to the vehicle frame or mounting of other subassemblies. A pivot control plate 136 is disposed upon each of the mounting platform rail and chassis reinforcement members 132. The pivot control plates 136 extend downward providing a reasonable pivot location for a carrier pivotal control device 154. A mounting platform pivot mating interface 137 of the pivot control plate 136 is provided for receiving a carrier pivot mating interface 156 disposed at a first end of the carrier pivotal control device 154. It is understood the mounting platform pivot mating interface 137 can be of any form factor and provided at any reasonable location to achieve the desired mechanics of the system. A pair of integrated wheel lift fore/aft slide channels 187 is provided for receiving a wheel lift subassembly (180 of FIG. 7). A pair of taillight subassemblies 142 can be integrated at the loading end of the chassis mounting platform assembly 130. It is understood that tail light subassembly 142 can be assembled to the loading end of the chassis mounting platform assembly 130 (as illustrated), the carrier body subassembly 110, or any other reasonable rearward location.

The carrier intermediate subframe subassembly 150 is fabricated of a pair of carrier intermediate subframe rails 152 disposed in a parallel arrangement. A carrier tilt and longitudinal control inner subframe slide channel 148 is attached to the interior side of each of the carrier intermediate subframe rails 152 for slideably receiving the carrier tilt and longitudinal control inner pivotal subframe 172. At least one carrier intermediate subframe cross member 153 is assembled attaching the carrier intermediate subframe rails 152 in order to maintain the carrier intermediate subframe rails 152 in a parallel arrangement. The carrier pivotal control device 154 is pivotally attached to the carrier intermediate subframe subassembly 150 at a carrier second pivot interface 158, wherein the pivot location is located proximate the cab end of the carrier intermediate subframe subassembly 150. A carrier body longitudinal actuator member 160 is provided having a first end attached to the cab end of the carrier intermediate subframe subassembly 150 via a carrier body actuator mounting and pivot bracket 162, as illustrated or by other means. A second end of the carrier body longitudinal actuator member 160 is attached to the carrier body subassembly 110. The carrier intermediate subframe rails 152 preferably include a "C" channel attached along an interior surface, the "C" channels being referred to as a carrier tilt and longitudinal control inner subframe slide channel 148 as illustrated for slideably receiving the carrier tilt and longitudinal control inner pivotal subassembly 170. Bearing strips would be provided between the sliding interfaces, including between the carrier body sill frame channels 118 and carrier tilt and longitudinal control inner subframe slide channels 148 as well as between other sliding interfaces.

The carrier tilt and longitudinal control inner pivotal subassembly 170 is fabricated having an inner pivotal tilt and longitudinal control motion actuator 176 having a first end attached to a feature of the carrier tilt and longitudinal control inner pivotal subassembly 170. A second end of the inner pivotal tilt and longitudinal control motion actuator 176 is attached to a carrier intermediate subframe rear cross member 174. The carrier intermediate subframe rear cross member 174 is secured to the loading end of the carrier intermediate subframe subassembly 150. A carrier tilt and longitudinal control inner subframe pivot 119 is provided, preferably located proximate a loading end of the carrier tilt and longitudinal control inner pivotal subassembly 170. The carrier tilt and longitudinal control inner subframe pivot 119 is assembled to a mating member disposed upon a rear portion of the chassis mounting platform assembly 130, providing a means for the carrier tilt and longitudinal control inner pivotal subassembly 170, and respectively the carrier intermediate subframe subassembly 150 to travel and pivot there about.

The carrier tilt and longitudinal control inner subassembly 170 slideably engages with carrier intermediate subframe subassembly 150. In the preferred embodiment, the carrier tilt and longitudinal control inner pivotal subframe 172 is slideably inserted between the pair of inner subframe fore/aft slide channels 148, with bearing strips provided therebetween. The carrier tilt and longitudinal control inner pivotal subassembly 170 pivotally engages with the chassis mounting platform assembly 130 proximate the loading end of the chassis mounting platform assembly 130 via the carrier tilt and longitudinal control inner subframe pivot 119.

Figure 8:
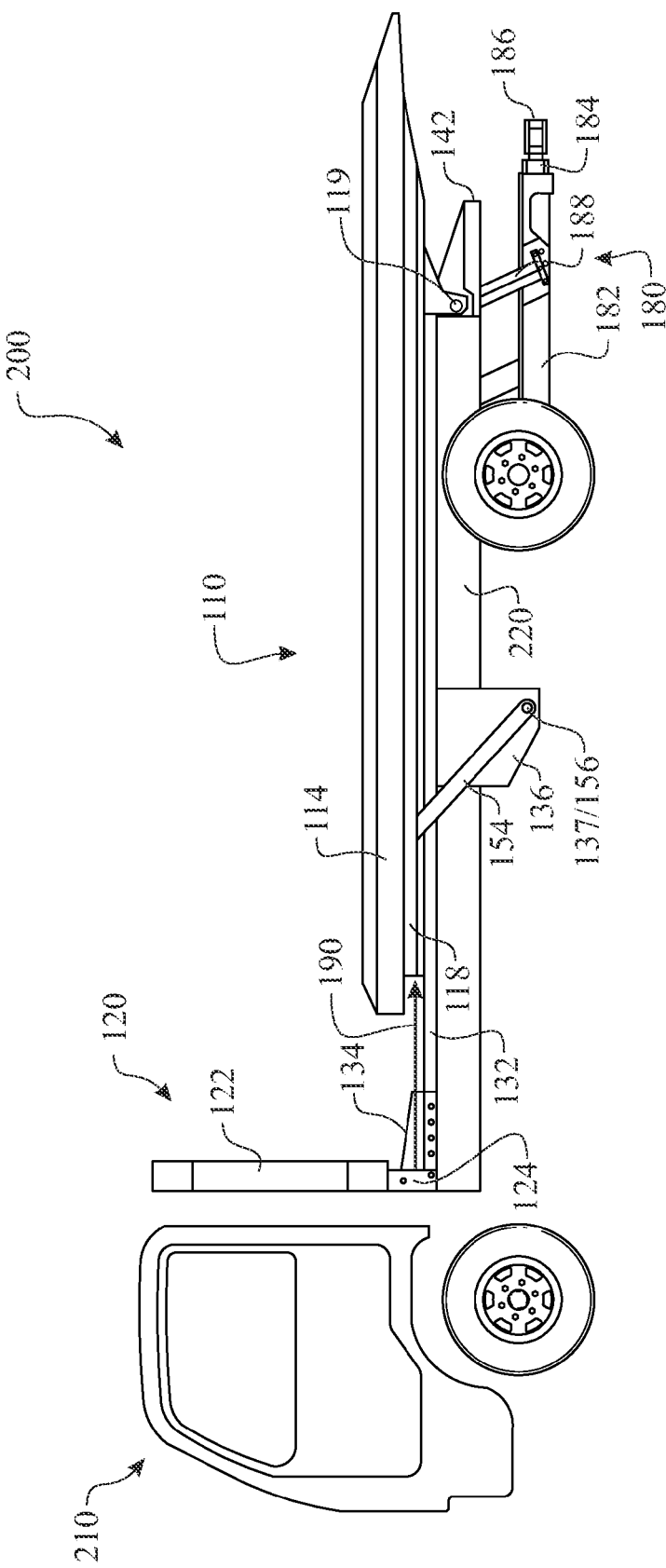
FIG. 8 presents an elevation view of the carrier vehicle illustrating a longitudinal motion of the carrier body.

An optional, but preferred cab protector cage assembly 120 is assembled to a cab end of the chassis mounting platform assembly 130, providing a barrier between objects placed onto the carrier body subassembly 110 and a vehicle cab (210 of FIG. 8). The cab protector cage assembly 120 comprises a cab protector frame 122 having a series of horizontal and vertical dividing members within the interior defined by the cab protector frame 122. A pair of cab protector mounting interface 124 extends downward from the cab protector frame 122 for attaching the cab protector cage assembly 120 to the chassis mounting platform assembly 130. A cab protector mount receiver 125 can be provided at the cab end of each of the mounting platform rail and chassis reinforcement member 132 for receiving a cab protector mounting interface 124. This interchangeable interface allows the installer to insert a cab protector cage assembly 120 designed specifically to compliment the size and shape of the cab 210 of the donor vehicle. This provides for a variety of alternate components the installer selects to inventory.

The carrier operates in accordance with the following motions:

Operation of the carrier body longitudinal actuator member 160 slides the carrier body subassembly 110 forward and aft, tracking along the carrier body sill frame channel 118 to carrier intermediate subframe rail 152 interface. In the illustrated exemplary embodiment, extending the carrier body longitudinal actuator member 160 moves the carrier body subassembly 110 rearward. Contracting the carrier body longitudinal actuator member 160 moves the carrier body subassembly 110 forward. Operation of the inner pivotal tilt and longitudinal control motion actuator 176 causes the carrier intermediate subframe subassembly 150 to exert a force upon the carrier second pivot interface 158, the force being applied towards the mounting platform pivot mating interface 137. The carrier tilt and longitudinal control inner pivotal subassembly 170 tracks within the carrier tilt and longitudinal control inner subframe slide channels 148 to carrier tilt and longitudinal control inner pivotal subframe 172 interface. The carrier pivotal control device 154 provides a carrier pivotal control which causes the carrier intermediate subframe subassembly 150 to pivot up, over, and rearward while sliding along the carrier tilt and longitudinal control inner pivotal subassembly 170 and pivoting about the carrier tilt and longitudinal control inner subframe pivot 119. In the preferred embodiment, the carrier pivotal control device 154 is a fixed beam. It is understood that the carrier pivotal control device 154 can be mechanically or otherwise adjustable.

Figure 9:
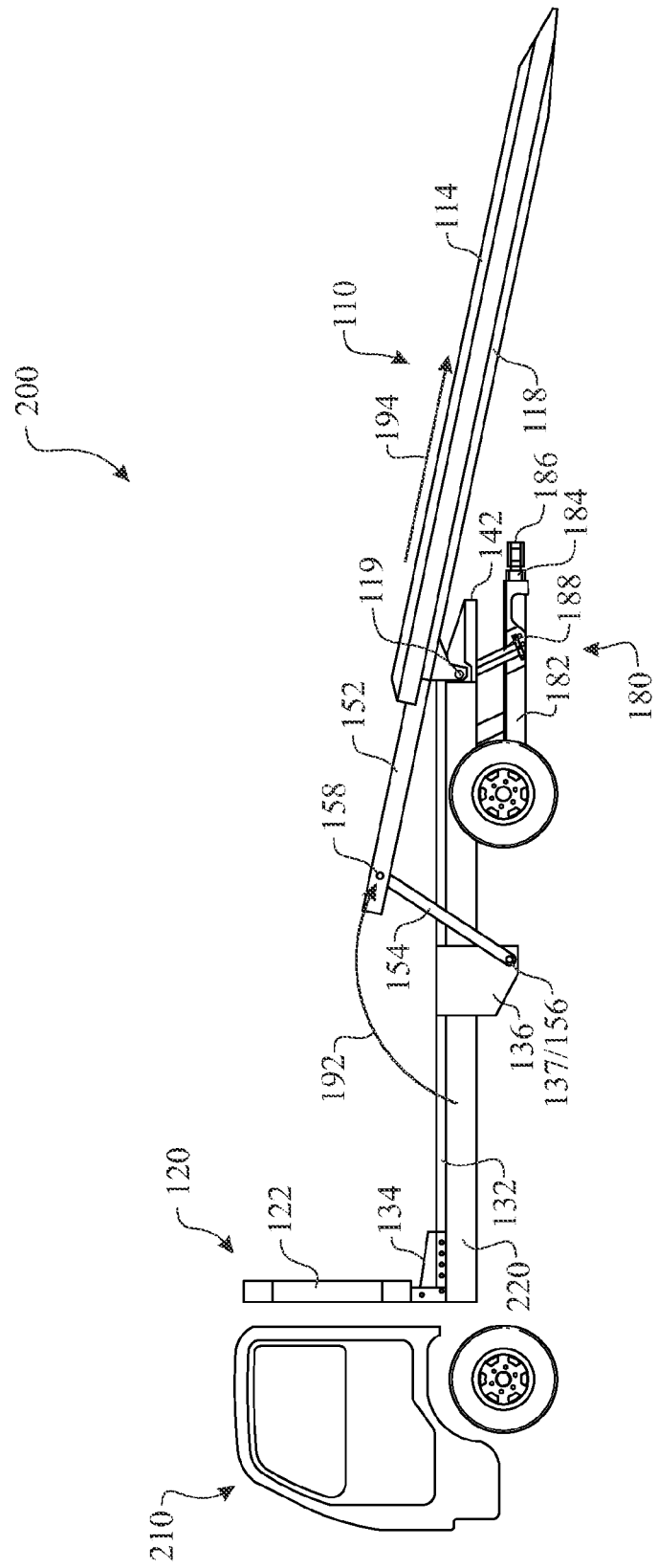
FIG. 9 presents an elevation view of the carrier vehicle illustrating a rearward transfer and pivotal motion of the assembled carrier body, and assemblies.

An exemplary carrier vehicle 200 having a carrier assembly 100 integrated thereon is illustrated in FIGS. 7 through 9. The carrier vehicle 200 includes a cab 210 assembled upon a vehicle frame 220. Although not identified, the carrier vehicle 200 additionally includes commonly known components such as wheels and tires, an engine and drive train, suspension, steering components, and the like. The chassis mounting platform assembly 130 is assembled to the vehicle frame 220.

An independent wheel lift subassembly 180 is slideably assembled within the wheel lift fore/aft slide channels 187 interface of the chassis mounting platform assembly 130, such to slide fore and aft. The independent wheel lift subassembly 180 comprises an independent wheel lift extendible inner boom 184 with an independent wheel lift extensible inner boom motive actuator 198 being slideably assembled within an independent wheel lift pivotal lifting boom assembly 182. An independent wheel lift rotational cross bar 186 is disposed upon a distal end of the independent wheel lift extendible inner boom 184. An independent wheel lift pivotal boom lifting actuator 188 is connected to wheel lift pivot actuator connecting bracket 168 having a first end which is affixed to wheel lift pivot actuator connecting bracket 168 mounted upon a wheel lift cross member 167 and second end attached to a pivot actuator boom bracket 183 which is assembled to the independent wheel lift pivotal lifting boom assembly 182. The fore/aft repositioning of the independent wheel lift between a retracted stored position and an extended towing position is accomplished by means of an independent wheel lift fore/aft motion actuator 185 having a first end attached to the independent wheel lift support cross member 140 and a second end attached to wheel lift extension actuator assembly joint 165 of the wheel lift pivot actuator connecting bracket 168. The independent wheel lift pivotal lifting boom assembly 182 is pivotally attached to the independent wheel lift slide rail members 178 via a pivotal boom transverse support member 189 via independent wheel lift lifting boom trunion pivot 196.

Figure 10:
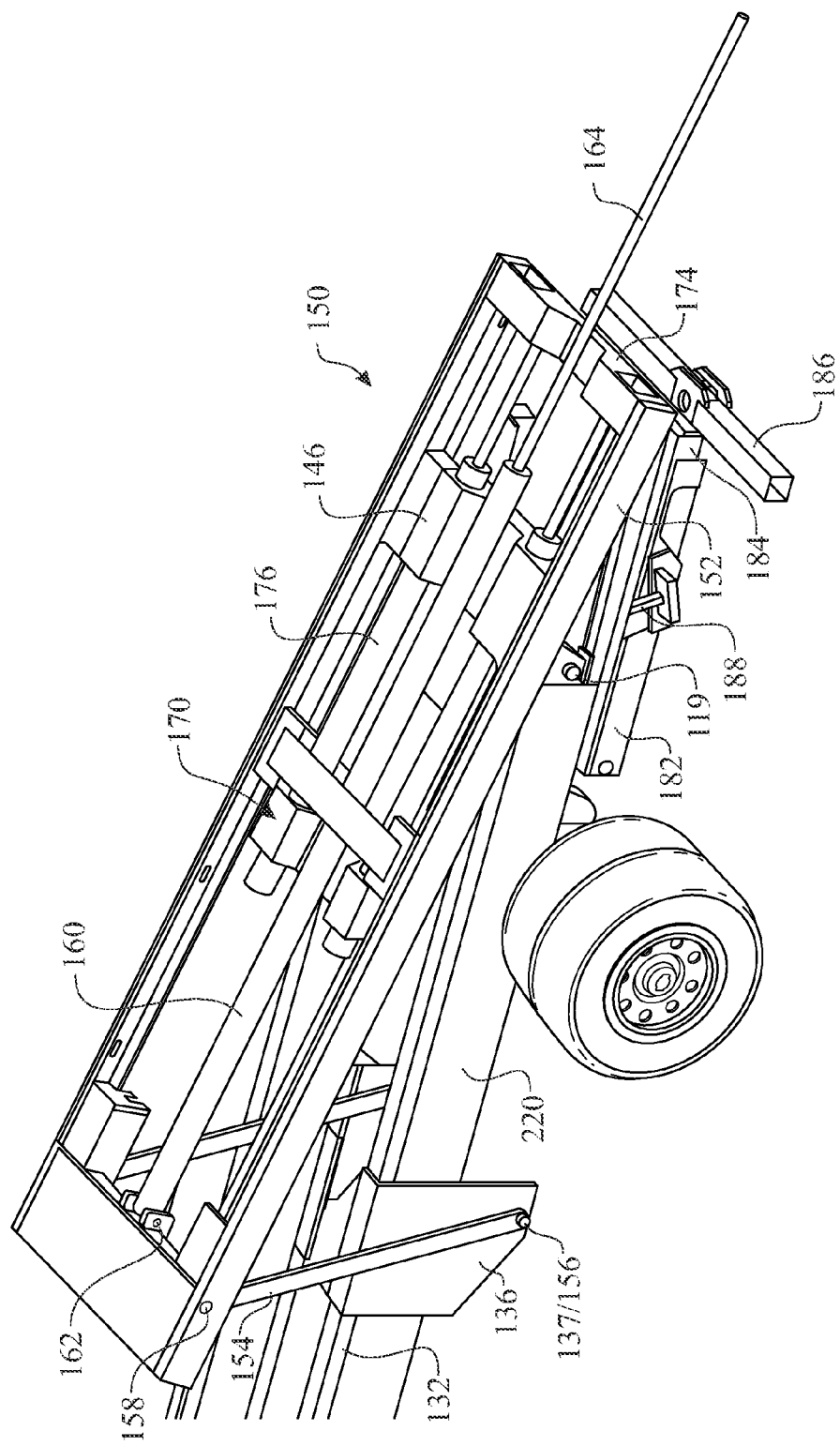
FIG. 10 presents an isometric view of the operating mechanisms of the flatbed carrier assembly illustrating an initial pivotal motion of the carrier body subassemblies.
Figure 11:
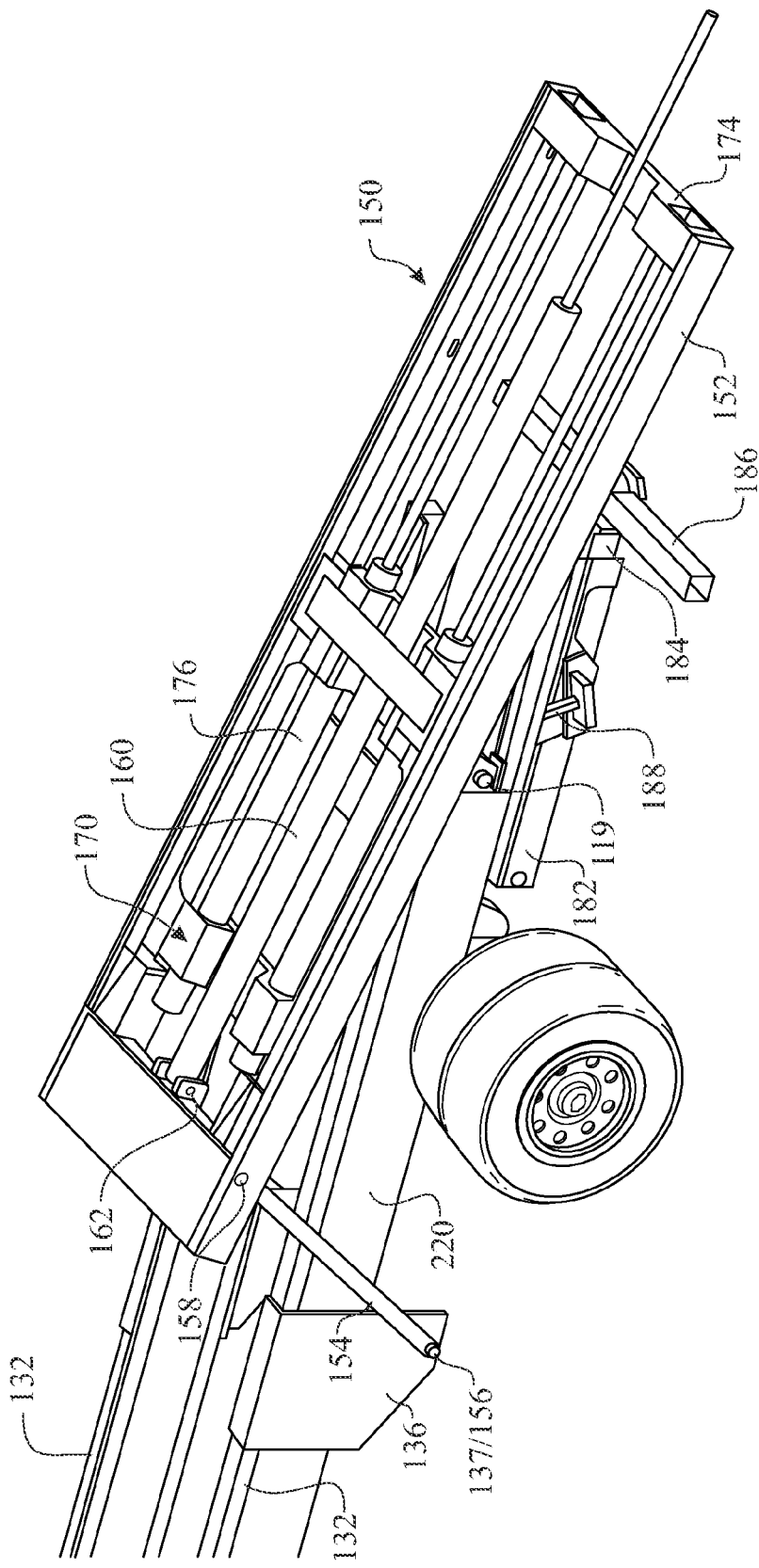
FIG. 11 presents an isometric view of the operating mechanisms of the flatbed carrier subassembly illustrating a continued and resultant rearward transfer and pivotal motion of the respective subassemblies.
Figure 12:
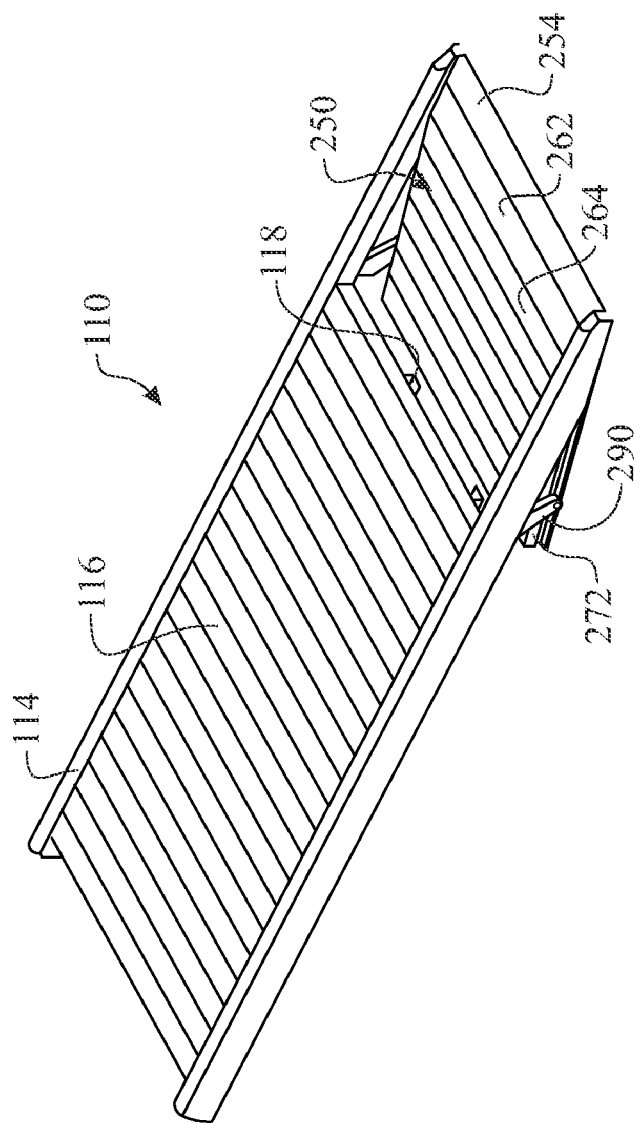
FIG. 12 presents an isometric view of a carrier body, introducing an integrated pivotal ramp assembly.
Figure 13:
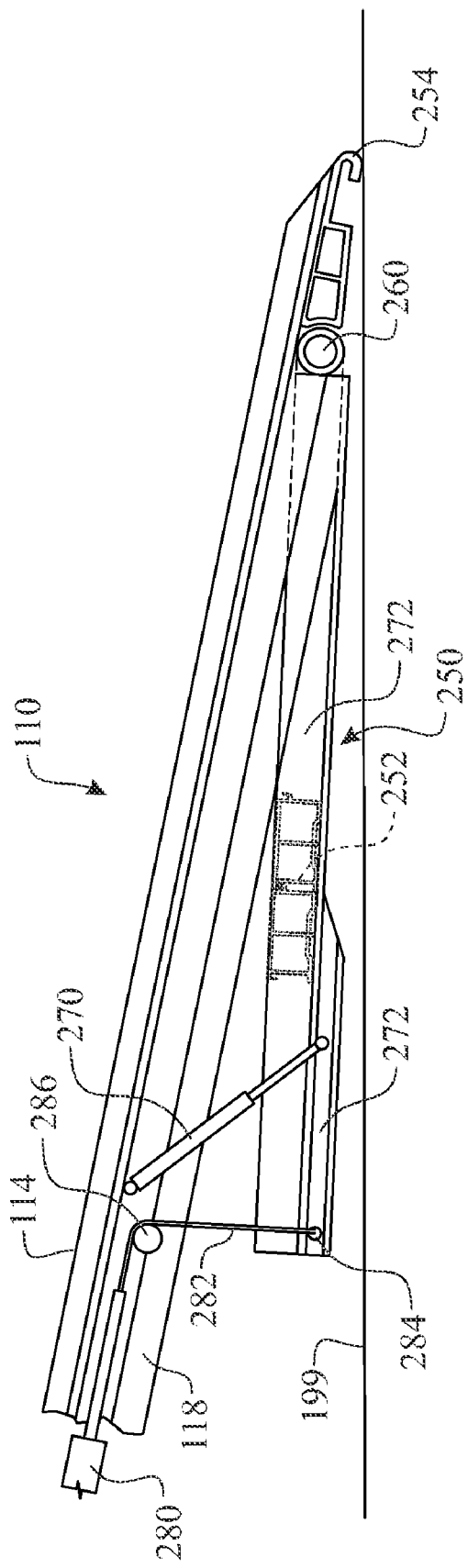
FIG. 13 presents a side elevation view of the pivotal ramp assembly of FIG. 12 operated via a cable chain drive assembly.
Figure 14:
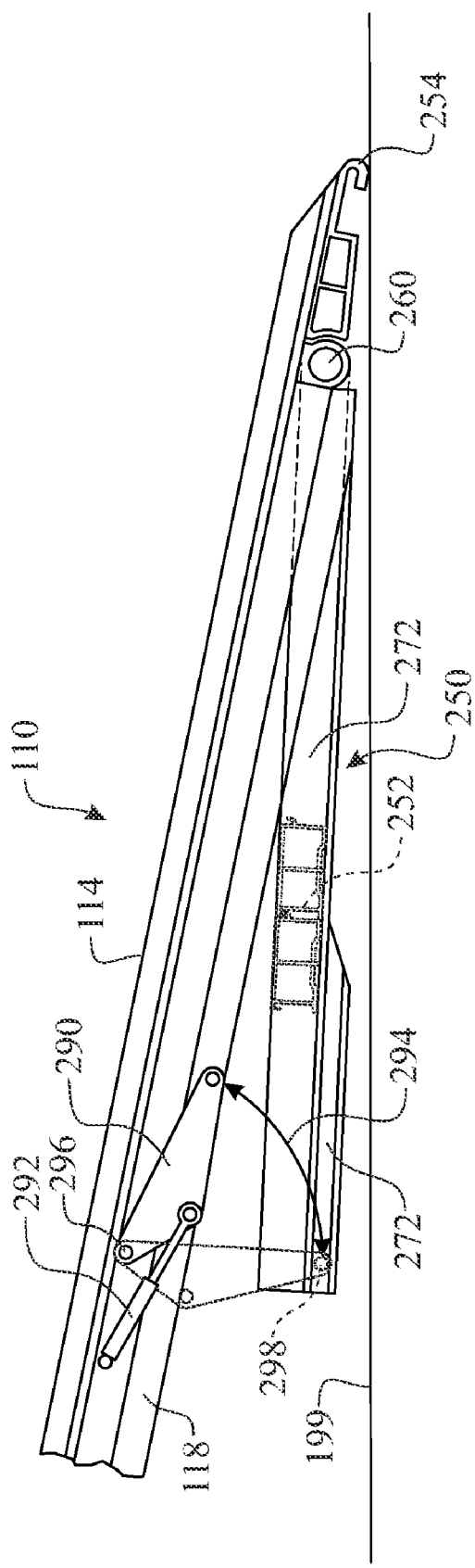
FIG. 14 presents a side elevation view of the pivotal ramp assembly of FIG. 12 operated via a cam assembly.

General operation of the carrier assembly 100 is illustrated in FIGS. 8 and 9. Respective details of the functional structures are exposed in FIGS. 10 and 11. The carrier body subassembly 110 slides aft in accordance with a rearward motion 190, as illustrated in FIG. 8. This motion is driven by the carrier body longitudinal actuator member 160. A motion actuator rod 164 extends and retracts from within a cylinder body of the carrier body longitudinal actuator member 160. The distal end of the motion actuator rod 164 is attached to the carrier body subassembly 110. The angle of the carrier body subassembly 110 is controlled via a rotation in accordance with a pivotal motion 192 (FIG. 9). The carrier intermediate subframe rail 152 is moved rearward via the inner pivotal tilt and longitudinal control motion actuator 176. As the carrier intermediate subframe rail 152 attempts to move rearward, a torque is generated against the carrier pivotal control device 154 causing the carrier intermediate subframe rail 152 to consequently travel up, over, and rearwardly while traveling via carrier tilt and longitudinal control inner pivotal subassembly 170 and pivoting about the carrier tilt and longitudinal control inner subframe pivot 119. The mounting platform pivot mating interface 137 must be positioned at a distance from the longitudinal axis of motion of the carrier intermediate subframe rail 152 in order to generate the necessary torque to pivot the carrier intermediate subframe rail 152. If the mounting platform pivot mating interface 137 were aligned with the longitudinal axis of motion of the carrier intermediate subframe rail 152, the subassembly would tend to bind upon attempted powered operation of the inner pivotal tilt and longitudinal control motion actuator 176. The carrier body subassembly 110 can be additionally adjusted along an incline until the loading end contacts the ground via a carrier body travel 194. The carrier body subassembly 110 moves along a sliding interface formed between the carrier body sill frame channel 118 and the carrier intermediate subframe rail 152. In this configuration, a vehicle may be driven upon the body, or alternately, winched thereon. A winch assembly may be affixed to the front or other portion of the carrier body subassembly 110.

A carrier body internal pivotal ramp subassembly 250 can be optionally integrated into the carrier body subassembly 110, as described by the exemplary illustrations presented in FIGS. 12 through 16. The carrier body internal pivotal ramp subassembly 250 functions as an independently operated subassembly. The carrier body internal pivotal ramp subassembly 250 comprises an internal ramp pivot 260 integrated into a carrier ramp assembly 252. The carrier ramp assembly 252 is fabricated of a series of interlocking floor extrusions 264 and a pivot floor member 262 assembled at the loading end of the carrier ramp assembly 252. Each of the interlocking floor extrusions 264 is formed to include an engagement interface receiver 269 along a first edge and an engagement interface hook 268 along a second edge. The engagement interface receiver 269 engages with the engagement interface hook 268 forming a locking floor engagement interface 266 along at least a portion of the length of the interlocking floor extrusion 264. The carrier body floor assembly 116 can be fabricated of a similar series of interlocking floor extrusions 264 of the carrier ramp assembly 252. An optional end cap extrusion (not shown, but well understood) can be provided on the exposed (loading) end of the carrier body floor assembly 116 and the cab end of the carrier ramp assembly 252. A pivotal floor side support and track member 272 can be assembled along each edge of the carrier ramp assembly 252, providing additional rigidity to the carrier ramp assembly 252.

A carrier body approach plate member 254 is provided aft of the carrier ramp assembly 252. The carrier body internal pivotal ramp subassembly 250 is pivotally attached to the carrier body edge rail 114 of the carrier body subassembly 110 via an internal ramp pivot 260. A pivotal control assembly is provided between a cab end of the carrier body internal pivotal ramp subassembly 250 and a respective location on the carrier body edge rail 114, as illustrated, or carrier body sill frame channel 118. The disclosure presents two exemplary embodiments of the pivotal control assembly. The first exemplary embodiment is presented in FIG. 13, utilizing an internal pivot ramp control cable chain 282, which is secured to the carrier body internal pivotal ramp subassembly 250 via a cable chain anchor 284, redirected over a cable chain redirecting pulley 286 and operated via an internal pivot ramp drive apparatus 280. A pressurized tensioning device 270 can be provided as an alternate embodiment or as a supplemental support to the cable chain embodiment. A second exemplary embodiment is presented in FIG. 14, utilizing a ramp pivot cam 290. A cam actuator 292 rotates the ramp pivot cam 290 via a cam rotation 294 about a body pivot interface 296 to raise and lower the carrier body internal pivotal ramp subassembly 250 via a ramp pivot interface 298. The ramp pivot interface 298 is preferably a pinned bearing block allowing for dimensional adjustments to avoid any binding along pivotal floor side support and track member 272.

Figure 15:
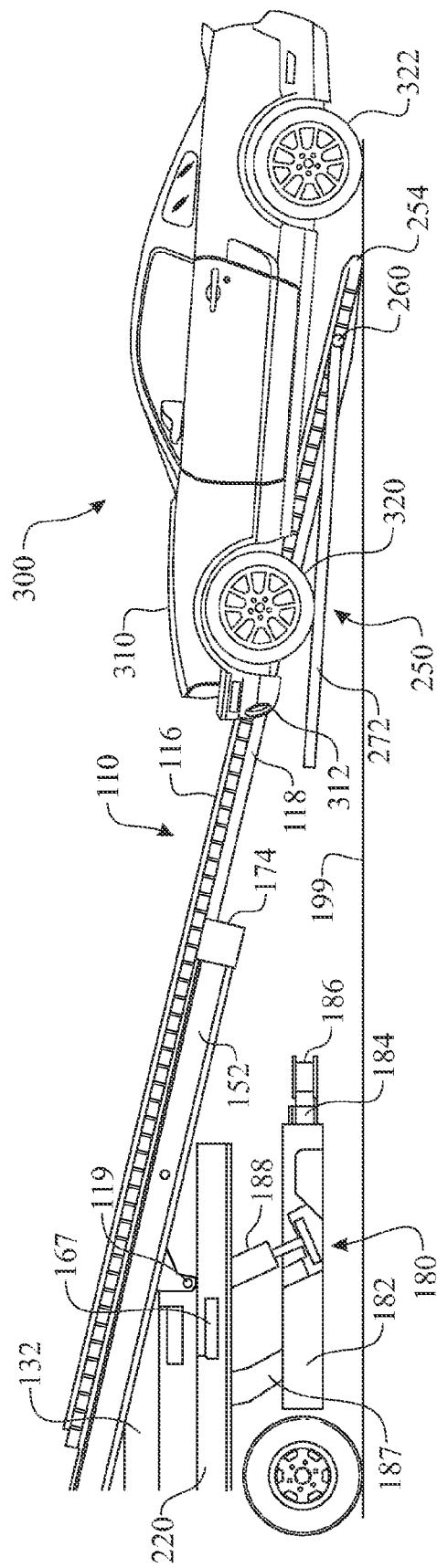
FIG. 15 presents a side elevation view of a rear portion of the carrier vehicle positioned in a loading configuration.

The operator aligns the carrier assembly 100 with a transported vehicle-for-tow 300 or a vehicle-for-tow, leaving sufficient space therebetween for sliding and positioning the carrier body subassembly 110 into a loading position. The vehicle-for-tow 300 can be loaded from the front or rear. The vehicle-for-tow 300 is defined has having a transported vehicle body 310 riding upon loading wheels 320 and trailing wheels 322. The transported vehicle body 310 includes a transported vehicle lower valance 312, wherein the transported vehicle lower valance 312 is the lowest leading edge of the vehicle-for-tow 300 and the lowest trailing edge of the vehicle-for-tow 300. It is common that the transported vehicle lower valance 312 becomes damaged during a process of loading the vehicle-for-tow 300 onto a conventional carrier body subassembly 110. The operator would direct the carrier body subassembly 110 into an angled, loading configuration, positioning the carrier body approach plate member 254 in contact with the supporting surface 199. The operator would then rotate the carrier body internal pivotal ramp subassembly 250, as described above, into a horizontal or nearly horizontal, loading configuration as illustrated in FIG. 15. This feature allows for damage free loading of a transported vehicle 300 having a low transported vehicle lower valance 312 or other low feature located forward of loading wheels 320. The service person would load the loading wheels 320 onto the carrier body ramp flooring 252, where the leading edge of the transported vehicle body 310 remains clear of a rear edge of the carrier body support planks 116. The leading edge of the carrier body ramp flooring 252 is then rotated, orienting the carrier body ramp flooring 252 to be parallel and in alignment with the carrier body support planks 116. The vehicle-for-tow 300 is drawn forward, loading the vehicle-for-tow 300 onto the carrier body subassembly 110.

An independent wheel lift subassembly 180 can be integrated onto the carrier vehicle 200 as best shown in FIGS. 7-9 and 17-21. The independent wheel lift subassembly 180 is a complete subassembly, having an independent wheel lift pivotal lifting boom assembly 182 pivotally attached to an independent wheel lift slide enabling subframe 181 via a pivotal boom transverse support member 189. At least one independent wheel lift pivotal boom lifting actuator 188 provides a drive mechanism to pivot the independent wheel lift pivotal lifting boom assembly 182 via the pivotal boom transverse support member 189. In the exemplary embodiment, independent wheel lift pivotal lifting boom assembly 182 is affixed to the pivotal boom transverse support member 189 and rotates about the independent wheel lift lifting boom trunion pivot 196. When the independent wheel lift pivotal boom lifting actuator 188 extends, the independent wheel lift pivotal lifting boom assembly 182 pivots downward towards a loading configuration. When the independent wheel lift pivotal boom lifting actuator 188 contracts, the independent wheel lift pivotal lifting boom assembly 182 pivots upward, lifting the towed vehicle into a transporting configuration. The independent wheel lift extendible inner boom 184 is slideably assembled within the independent wheel lift pivotal lifting boom assembly 182 and horizontally positioned via an independent wheel lift extensible inner boom motive actuator 198. The actuator 198 (not shown, but well understood) is preferably a dual action, hydraulic piston assembly. An independent wheel lift rotational cross bar 186 is provided along a distal end of the independent wheel lift extendible inner boom 184. The independent wheel lift rotational cross bar 186 is preferably configured to be perpendicular to the independent wheel lift extendible inner boom 184 and parallel to the supporting surface 199. The independent wheel lift rotational cross bar 186 can include features commonly associated with presently available wheel lifts, such as self-actuating wheel grabbers. The independent wheel lift rotational cross bar 186 can be connectively assembled to the independent wheel lift extendible inner boom 184, allowing the owner/operator to exchange the independent wheel lift rotational cross bar 186 with various specialized automotive vehicle wheel retaining devices commonly available through third party automotive towing equipment manufacturers or suppliers.

When the independent wheel lift subassembly 180 is in a retracted, stored configuration, the independent wheel lift rotational cross bar 186 acts as an under ride, protective device member upon collision with other vehicles following the carrier vehicle 200. Since the independent wheel lift subassembly 180 operates independently from the carrier body subassembly 110, and its adjoining subassemblies 170 and 150, the independent wheel lift rotational cross bar 186 can be positioned against the supporting surface 199 when loading vehicles onto the carrier body subassembly 110. This increases the stability of the carrier vehicle 200 during loading/unloading of vehicles from the carrier body subassembly 110.

The independent wheel lift slide enabling subframe 181 is within the wheel lift fore/aft slide channel 187 of the chassis mounting platform assembly 130. The independent wheel lift fore/aft motion actuator 185 is integrated into the independent wheel lift subassembly 180, having a first end attached to a member of the chassis mounting platform assembly 130 and a second end attached to the independent wheel lift slide enabling subframe 181. In the exemplary embodiment, the first end of the independent wheel lift fore/aft motion actuator 185 is attached to the independent wheel lift subassembly support cross member 140 of the chassis mounting platform assembly 130. The second end of the independent wheel lift fore/aft motion actuator 185 is attached to the wheel lift pivot actuator connecting bracket 168 which is affixed to wheel lift cross member 167 of the independent wheel lift slide enabling subframe 181. The independent wheel lift fore/aft motion actuator 185 extends and contracts to position the independent wheel lift subassembly 180 within the respective wheel lift fore/aft slide channels 187 of the chassis mounting platform assembly 130 between a retracted stowed position and a rearward, towing position.

The present invention provides several advantages over the existing art in the industry. The carrier assembly 100 is designed as a complete subassembly, allowing for its installation onto any reasonably sized truck chassis frame 220. Adaptors 222, 224 (FIG. 20) can be provided for mounting and securing the chassis mounting platform assembly 130 onto a variety of vehicle chassis frames 220 of varying dimensions. This provides for a standardized carrier assembly 100 and mounting means that will accommodate a variety of vehicle chassis without changes or compromises of the carrier vehicle. The carrier body assembly 100 need only to be of sufficient length to accommodate the overall wheel base spread of the transported vehicle, without concern of a rearward over extended body or platform, simply to provide a longer ramp in order to secure a reduced loading angle during loading/unloading. The new inventive matter with a shortened carrier body assembly, and accompanying subassemblies, with ability to be pivotally postured and transferred rearward upon initiation of its operative sequence through its intermediate connecting subassembly 150 provides for the same resultant decreased loading angle, which is then further enhanced by the downward deployment of the inclusive carrier body pivotal ramp subassembly 250.

The angle of the carrier assembly 100 is achieved via a single actuator motion, via the carrier tilt and longitudinal control inner subframe motion actuator 176. This controlled action of carrier assembly 100 and the sliding interface activity between the carrier intermediate subframe subassembly 150 and the carrier tilt and longitudinal control inner pivotal subassembly 170, minimizes operator error resulting from incorrect rotation of the carrier body subassembly 110. Integrating a carrier body internal pivotal ramp subassembly 250 within allows the operator to further optimize a transition for loading of a vehicle to be carried between the supporting surface 199 and the angled carrier body floor assembly 116, thus providing loading without abrasion or damage to a vehicle having a low front or rear clearance.

The assemblage of the carrier body floor assembly 116 utilizing a series of interlocking extrusions, such as the interlocking floor extrusion 264, which provides a rigid structure with minimal framing and fabrication cost.

It is understood that lighting would be integrated onto the carrier assembly 100 to ensure the lighting complies with the respective state and federal regulations for the carrier vehicle 200 as converted. This would accommodate conversions using light and medium duty trucks into the carrier vehicle 200.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What I claim is:

1. A method of positioning a flatbed vehicle carrier assembly for loading a vehicle thereon, the method comprising steps:
    obtaining a carrier assembly, the carrier assembly comprising:
        a flatbed carrier body,
        a flatbed carrier tilt frame subassembly,
        a carrier tilt frame longitudinal control subassembly,
        a chassis mounting frame assembly, and
        a carrier tilt frame pivot member;
        wherein the flatbed carrier body is slideably mounted to the flatbed carrier tilt frame subassembly,
        wherein the flatbed carrier tilt frame subassembly slideably engages with the carrier tilt frame longitudinal control subassembly,
        wherein the carrier tilt frame longitudinal control subassembly is pivotally assembled to the chassis mounting frame assembly, and
        wherein a first end of the carrier tilt frame pivot member is pivotally assembled to a forward end of the flatbed carrier tilt frame subassembly and a second end of the carrier tilt frame pivot member is pivotally assembled to the chassis mounting frame assembly; and
    tilting the flatbed carrier body by slideably positioning the flatbed carrier tilt frame subassembly rearward causing the carrier tilt frame pivot member to raise the forward end of the flatbed carrier tilt frame subassembly.

2. A method of positioning a flatbed vehicle carrier assembly for loading a vehicle thereon as recited in claim 1, the method further comprising step of:
    slidably positioning the flatbed carrier body rearward along the flatbed carrier tilt frame subassembly.

3. A method of positioning a flatbed vehicle carrier assembly for loading a vehicle thereon as recited in claim 2, wherein the carrier assembly further comprises a carrier body pivotal ramp subassembly pivotally integrated into a rear section of the flatbed carrier body,
the method further comprising step of:
pivoting a carrier body pivotal ramp subassembly into a loading position by lowering a forward edge of the carrier body pivotal ramp, wherein the carrier body pivotal ramp pivots about a ramp pivot is assembled to a flatbed carrier body location proximate a rear end thereof.

4. A method of positioning a flatbed vehicle carrier assembly for loading a vehicle thereon as recited in claim 3, the method further comprising steps of:
positioning loading wheels of a vehicle-for-tow onto the carrier body pivotal ramp;
pivoting the carrier body pivotal ramp subassembly into a transporting position by raising the forward edge of the carrier body pivotal ramp to align with the flatbed carrier body.

5. A method of positioning a flatbed vehicle carrier assembly for loading a vehicle thereon as recited in claim 4, the method further comprising steps of:
positioning trailing wheels of the vehicle-for-tow onto the flatbed carrier body; and
sliding the flatbed carrier body forward into a transporting position.

6. A method of positioning a flatbed vehicle carrier assembly for loading a vehicle thereon as recited in claim 5, the method further comprising step of:
returning the flatbed carrier body to a transporting configuration by slideably distancing the flatbed carrier tilt frame subassembly and the carrier tilt frame longitudinal control subassembly together causing the carrier tilt frame pivot member to lower the forward end of the flatbed carrier tilt frame subassembly.

7. A method of positioning a flatbed vehicle carrier assembly for loading a vehicle thereon, the method comprising steps:
obtaining a carrier assembly, the carrier assembly comprising:
a flatbed carrier body comprising a body floor and a pair of carrier body edge rails, each edge rail located along each outer edge of the flatbed carrier body, wherein the flatbed carrier body is pivotally carried by a towing vehicle frame,
a carrier body pivotal ramp subassembly comprising a carrier body ramp flooring and a ramp pivot, wherein the carrier body pivotal ramp subassembly is in pivotal communication with a trailing region of the carrier body edge rails,
rotating the flatbed carrier body by lowering a trailing edge of the flatbed carrier body placing the body floor into a rotated loading configuration; and
pivoting the carrier body ramp flooring into a loading position by lowering a leading edge until the carrier body ramp flooring is more horizontal than the rotated body floor for loading a vehicle-for-tow.

8. A method of positioning a flatbed vehicle carrier assembly for loading a vehicle thereon as recited in claim 7, wherein the carrier assembly further comprises a flatbed carrier frame subassembly and the flatbed carrier body is slideably engaging with the flatbed carrier frame subassembly, the method further comprising step of:
slidably positioning the flatbed carrier body rearward along a flatbed carrier frame subassembly.

9. A method of positioning a flatbed vehicle carrier assembly for loading a vehicle thereon as recited in claim 8, the method further comprising steps of:
positioning loading wheels of the vehicle-in-tow onto the carrier body pivotal ramp;
pivoting the carrier body pivotal ramp subassembly into a transporting position by raising the forward edge of the carrier body pivotal ramp to align with the flatbed carrier body.

10. A method of positioning a flatbed vehicle carrier assembly for loading a vehicle thereon as recited in claim 9, the method further comprising steps of:
positioning trailing wheels of the vehicle-in-tow onto the flatbed carrier body; and
returning the flatbed carrier body into a transporting position.

11. A method of positioning a flatbed vehicle carrier assembly for loading a vehicle thereon as recited in claim 7, wherein the carrier assembly further comprises a wheel lift subassembly, the wheel lift subassembly comprising a wheel lift cross bar in slideable communication with a wheel lift boom assembly and the wheel lift boom assembly is in pivotal communication with the towing vehicle frame,
the method further comprising step of:
positioning the wheel lift subassembly to support and transport a vehicle.

12. A method of positioning a flatbed vehicle carrier assembly for loading a vehicle thereon as recited in claim 11, wherein the carrier assembly further comprises a flatbed carrier frame subassembly and the flatbed carrier body is slideably engaging with the flatbed carrier frame subassembly, the method further comprising step of:
slidably positioning the flatbed carrier body along a flatbed carrier frame subassembly into a position for transporting the vehicle-for-tow.

13. A method of positioning a flatbed vehicle carrier assembly for loading a vehicle thereon as recited in claim 12, wherein the step of positioning the wheel lift subassembly to support and transport a vehicle comprises a step of longitudinally positioning the wheel lift cross bar to position the vehicle-in-tow having sufficient distance behind a trailing edge of the flatbed carrier body for towing.

14. A method of positioning a flatbed vehicle carrier assembly for loading a vehicle thereon, the method comprising steps:
obtaining a carrier assembly, the carrier assembly comprising:
a flatbed carrier body,
a flatbed carrier tilt frame subassembly,
a carrier tilt frame longitudinal control subassembly,
a chassis mounting frame assembly, and
a carrier tilt frame pivot member;
wherein the flatbed carrier body is slideably mounted to the flatbed carrier tilt frame subassembly and interconnected by a flatbed carrier body longitudinal control motion actuator,
wherein the flatbed carrier tilt frame subassembly slideably engages with the carrier tilt frame longitudinal control subassembly and interconnected by a flatbed carrier tilt frame pivot control motion actuator,
wherein the carrier tilt frame longitudinal control subassembly is pivotally assembled to the chassis mounting frame assembly, and
wherein a first end of the carrier tilt frame pivot member is pivotally assembled to a forward end of the flatbed carrier tilt frame subassembly and a second end of the carrier tilt frame pivot member is pivotally assembled to the chassis mounting frame assembly;

slideably positioning the flatbed carrier body by actuating the flatbed carrier tilt frame pivot control motion actuator; and tilting the flatbed carrier body by slideably positioning the flatbed carrier tilt frame subassembly rearward by actuating the flatbed carrier tilt frame pivot control motion actuator, causing the carrier tilt frame pivot member to raise the forward end of the flatbed carrier tilt frame subassembly.

15. A method of positioning a flatbed vehicle carrier assembly for loading a vehicle thereon as recited in claim 14, wherein the carrier assembly further comprises a carrier body pivotal ramp subassembly pivotally integrated into a rear section of the flatbed carrier body, the method further comprising step of:

pivoting a carrier body pivotal ramp subassembly into a loading position by lowering a forward edge of the carrier body pivotal ramp, wherein the carrier body pivotal ramp pivots about a ramp pivot is assembled to a flatbed carrier body location proximate a rear end thereof.

16. A method of positioning a flatbed vehicle carrier assembly for loading a vehicle thereon as recited in claim 15, the method further comprising steps of:

positioning loading wheels of a vehicle-for-tow onto the carrier body pivotal ramp;

pivoting the carrier body pivotal ramp subassembly into a transporting position by raising the forward edge of the carrier body pivotal ramp to align with the flatbed carrier body.

17. A method of positioning a flatbed vehicle carrier assembly for loading a vehicle thereon as recited in claim 16, the method further comprising steps of:

positioning trailing wheels of the vehicle-for-tow onto the flatbed carrier body; and sliding the flatbed carrier body forward into a transporting position.

18. A method of positioning a flatbed vehicle carrier assembly for loading a vehicle thereon as recited in claim 17, the method further comprising step of:

returning the flatbed carrier body to a transporting configuration by slideably distancing the flatbed carrier tilt frame subassembly and the carrier tilt frame longitudinal control subassembly together causing the carrier tilt frame pivot member to lower the forward end of the flatbed carrier tilt frame subassembly.

19. A method of positioning a flatbed vehicle carrier assembly for loading a vehicle thereon as recited in claim 15, wherein the carrier assembly further comprises a wheel lift subassembly, the wheel lift subassembly comprising a wheel lift cross bar in slideable communication with a wheel lift boom assembly and the wheel lift boom assembly is in pivotal communication with the towing vehicle frame, the method further comprising step of:

positioning the wheel lift subassembly to support and transport a vehicle.

20. A method of positioning a flatbed vehicle carrier assembly for loading a vehicle thereon as recited in claim 19, wherein the carrier assembly further comprises a flatbed carrier frame subassembly and the flatbed carrier body is slideably engaging with the flatbed carrier frame subassembly, the method further comprising step of:

slidably positioning the flatbed carrier body along a flatbed carrier frame subassembly into a position for transporting the vehicle-for-tow.

\* \* \* \* \*